United States Patent
Burns et al.

(10) Patent No.: US 6,449,291 B1
(45) Date of Patent: Sep. 10, 2002

(54) METHOD AND APPARATUS FOR TIME SYNCHRONIZATION IN A COMMUNICATION SYSTEM

(75) Inventors: Lawrence M. Burns, Mountain View; Edward Boyd, Petaluma, both of CA (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/199,030

(22) Filed: Nov. 24, 1998

(51) Int. Cl.[7] .................................................. H04J 3/06
(52) U.S. Cl. ...................................... 370/516; 375/371
(58) Field of Search .......................... 370/94.2, 503, 370/79, 519, 520; 375/354, 222, 371, 356, 362; 390/516; 725/185, 138

(56) References Cited

U.S. PATENT DOCUMENTS

| | | | |
|---|---|---|---|
| 5,293,627 A | 3/1994 | Kato et al. | 395/550 |
| 5,467,342 A | 11/1995 | Logston et al. | 370/576 |
| 5,471,614 A | 11/1995 | Kakimoto | 395/650 |
| 5,533,021 A | 7/1996 | Branstad et al. | 370/576 |
| 5,537,408 A * | 7/1996 | Branstad et al. | 370/473 |
| 5,566,180 A * | 10/1996 | Eidson et al. | 370/473 |
| 5,634,008 A | 5/1997 | Gaffaney et al. | 395/200.11 |
| 5,640,388 A | 6/1997 | Woodhead et al. | 370/468 |
| 6,111,924 A * | 8/2000 | McKinley | 375/354 |
| 6,144,695 A * | 11/2000 | Helms et al. | 375/222 |
| 6,181,716 B1 * | 1/2001 | Lide | 370/519 |
| 6,252,891 B1 * | 6/2001 | Perches | 370/503 |
| 2001/0024455 A1 * | 9/2001 | Thaler et al. | 370/503 |

OTHER PUBLICATIONS www.stelhq.com/prod/02cable/headend.htm website printout (3 Pages), Jul. 9, 1998.

www.stelhq.com/prod/02cable/sub.htm website printout (5 pages), Jul. 9, 1998.

\* cited by examiner

*Primary Examiner*—Hassan Kizou
*Assistant Examiner*—Lu Yin
(74) *Attorney, Agent, or Firm*—McDonnell Boehnen Hulbert & Berghoff

(57) ABSTRACT

A method and apparatus for time synchronization in a communications system such as a system including cable modems is provided. The synchronization method comprises the steps of receiving a first timestamp from a headend unit with the cable modem, and generating a first cable modem time reference with the cable modem in response to the receipt of the first timestamp. The cable modem then receives a second timestamp from the headend unit and generates a second cable modem time reference in response to the receipt of the second timestamp. A headend difference time comprising the difference of the first and second timestamps is then generated as is a cable modem difference time comprising the difference of the first and second cable modem time references. A clock error time that comprises the difference of the headend difference time and the cable modem difference time is then generated as well as a correction factor in response to the clock error time. The local clock of the cable modem is then synchronized with the master clock of the headend unit through the adjusting of the output of the local clock output in response to the correction factor. The correction factor in one instance comprises an offset value representative of the amount of clock error per local clock pulse. This offset value is added to an accumulator on each local clock pulse, and the local clock output is adjusted when the accumulator rolls over. The synchronized clock signal can then be utilized to determine a time slot in which the cable modem can transmit an upstream signal to the headend without colliding the upstream signal with upstream signals from other modems in the system.

54 Claims, 15 Drawing Sheets

METHOD AND APPARATUS FOR TIME SYNCHRONIZATION IN A COMMUNICATION SYSTEM

1. BACKGROUND OF THE INVENTION a. Field of the Invention

The present invention relates to communication systems. In particular, the present invention relates to the synchronization of time signals amongst a plurality of communications system components such as cable modems.

b. Description of Related Art

As information becomes increasingly more available on communication networks such as a LAN or over the Internet, the development of new methods and apparatus for sending and receiving this information more quickly between communication system users has become an important issue. For instance, one-way and two-way cable modems, both internal and external, based on the Multimedia Cable Network System (MCNS) Data-Over-Cable Interface Specifications (DOCSIS) standard, are currently available to consumers to access data over the Internet at speeds far in excess of those previously attainable by standard analog telephone modems. An external cable modem is a complete, self contained unit which is housed in its own enclosure, separate from a personal computer (PC), as opposed to an internal cable modem which is designed as a peripheral card on a printed circuit board (PCB) inserted into a PC. Two-way cable modems receive modulated data from a head-end (H/E) controller over a 75-ohm coaxial cable (the same cable found in residential housing) and send back upstream data over this same cable to the headend controller. A one-way cable modem receives data from the headend on a 75-ohm cable, but transmits upstream data back to the headend using a standard analog telephone modem (i.e. 28/33/56 kbps). In each case the headend controller exists to serve a number of subscribers to the cable modem service.

Downstream (D/S) data for all subscribers is interleaved in time and continuously transmitted down the cable. The downstream data in one instance occupies a 6 MHz wide channel with a center frequency between 54–850 MHz. Raw D/S data rates may range between 30–40 Mbps. However, most subscribers will see much less than this since the downstream bandwidth needs to be shared with many other subscribers as stated earlier. A typical cable plant installation will have between 500 and 2000 subscribers on a particular downstream channel. In addition, there is some degree of overhead required for header data and forward error correction. This serves to lower the true raw data rate somewhat. If every subscriber were receiving data continuously, then the effective raw data rate seen by any one subscriber would be 1/500 or 1/2000 of the maximum D/S data rate possible after subtracting overhead. However, computer-computer data communications tend to be bursty in nature, and not every subscriber is logged on at the same time. This means that under nominal loading, each subscriber can expect to see effective D/S data rates in the range of 100's of kbps. FIG. 1 illustrates the typical D/S data stream 100 for a cable modem system. Notice that the D/S data contains both data for each modem 102 and general management packets 104.

In the case of D/S data, each cable modem continuously monitors the D/S channel. When data addressed to a particular modem is received, the modem takes appropriate action. All other data which is not addressed to that modem is ignored. In the case of the two-way cable modem system, all replies are transmitted on the upstream (U/S) channel of the coaxial cable back to the headend controller. In one instance of the typical two-way cable modem system, there is no contention (or collisions) on the D/S channel, because no modem ever uses the D/S data channel frequency for U/S data. For, in this system U/S data occupies channels of 200 kHz–3.2 Mz wide in the range of 5–42 MHz. The headend controller is the single system component which completely decides what data to what modem is sent when on the D/S channel.

However, in the case of the U/S data channel for a two-way system with a number of subscribers there are many cable modems which must compete with each other in some fashion to send their data back to the headend controller. Of course, if two modems try and send data at the same time to the headend controller, a collision can occur. Unlike a typical network such as an Ethernet, the individual cable modems can not "hear" (i.e. receive or monitor) data from other cable modems. This is due mostly to the one-way transmission property of the cable plant (due to directive circuit elements, such as power splitters, amplifiers and directional couplers) and also due to the large time delays inherent in the cable plant due to the large distances involved in the cable routing. FIG. 2 shows a diagram of a typical cable plant. The typical cable plant includes a headend controller 200 which is coupled to the rest of the plant via, in one instance, fiber optic cable 210. Data is passed from the headend 200 to the cable modems such as modems 1, 2, 3, 4, N, and N+1, via a network of combiners such as 2-way combiners 215, and 4-way combiners 220. Similarly, in a two-way system, data is passed from the cable modems to the headend 200 over the same network.

Therefore, it is up to the headend controller to decide which subscriber modem sends U/S data at what time. In one instance this is done by using a system of mini-slot time increments of around 6.25 usec each. Each modem is assigned a time in which it can transmit its signal so as to arrive at the headend controller in time-interleaved fashion, thereby not colliding with U/S data from other modem subscribers. For all of this to work, the headend controller performs a ranging operation to determine the time delay from each modem. The headend controller then figures out for each modem a time slot in which it can send its data so as to not collide with the U/S data from other modems at the headend controller. This sequence of events is illustrated by FIGS. 3(a)–(b) in which FIG. 3(a) shows a timing diagram illustrating how the U/S data from a number of cable modems looks by the time it reaches the headend controller associated with those cable modems. The blocks labeled Modem #1, Modem #234, Modem #57, Modem #465, Modem #1, and Modem #33 represent data sent from those respective modems to the headend 200. The blocks of time labeled guard time represent time slots in which data is not expected to be sent from any of the modems to the headend 200—this helps to minimize collisions of upstream data by minimizing the chance of data timeslot overlap. FIG. 3(b) depicts a timing diagram that illustrates a hypothetical example of the actual time that each U/S packet was sent, so as to arrive at the headend controller at the proper time. The details of this process are complicated and are described more fully in the MCNS DOCSIS specifications referred to earlier and which are hereby incorporated by reference.

As can be seen from the above discussion, in order for the U/S data synchronization to work, each modem needs an accurate local clock reference which is precisely in synchronization with the headend clock. In general, accurate clock references are derived from an accurate crystal oscillator whose frequency is divided down to the desired time interval. Since there is typically only one headend controller per every 500–2000 subscribers, it makes economic sense to buy a highly precise and accurate crystal oscillator. For this reason, headend crystal oscillators are typically of the expensive temperature-compensated type with frequency (and hence time) variations of just a few parts-per-million (ppm). However, in the case of an individual cable modem intended for the consumer market, cost is of paramount importance. Therefore, a typical cable modem contains an inexpensive, non-temperature-compensated crystal oscillator with an accuracy of 50–100 ppm as illustrated in FIG. 4(a) which shows a typical standard crystal oscillator configured to output a digital clock output to be used by the rest of the cable modem's integrated circuitry. Some of this variation comes from the wider temperature range each subscriber modem is expected to operate over, and some variation due to initial set-on accuracy.

Currently known methods of synchronizing modem clocks with headend clocks try and tune the local modem crystal oscillator to match the frequency of the headend clock. This is most often done by using a voltage-controlled crystal oscillator (VCXO) to slightly vary the local modem oscillator. A circuit designed to implement the VCXO approach of synchronization is illustrated in FIG. 4(b). The element used in such a circuit is a voltage-variable capacitor—often implemented with a varactor diode such as diode D1 of FIG. 4(b). This circuit operates to vary the capacitance of capacitor C1 and therefore the oscillating frequency of the Crystal Oscillator. In this type of circuit, successive timestamps from the headend are compared to time intervals from the local modem by the CPU 450. If the local modem is running too fast, the frequency of the modem clock oscillator is reduced. Likewise, if the local clock is running too slow, the modem clock oscillator is increased. This can be done in one instance by providing digital signals from the CPU 450 to the Digital/Analog Converter 455 which in turn varies the voltage at the input of resistor $R_x$ in order to adjust the capacitance of C1 and in turn adjust the Crystal Oscillators frequency.

There are a number of disadvantages with this approach. First, many successive timestamps need to be gotten from the headend. In order to avoid the problem of over-correction, and hence loop stability problems, corrections to the VCXO need to be kept small, so as to not overshoot the desired final frequency. Taking many timestamps can consume many seconds or even minutes (recall that each timestamp comes at 200–600 msec intervals). The problem is further exacerbated by the slow response of the crystal. Most crystals are very high-Q devices which take a long time to change to a new frequency. In addition, all of the components driving the VCXO are analog, thereby subject to temperature and aging problems as well as non-linearities.

Therefore, what is needed is a new method and apparatus which is capable of accurately synchronizing the clock of each cable modem of a two-way cable modem system with the clock of its headend controller in a cost-effective manner which avoids the aforementioned problems of currently known synchronization methods.

2. SUMMARY OF THE INVENTION

As discussed above, currently known methods of synchronizing local clocks of communications system components with the master clock of the communications system control component try and tune the local modem crystal oscillator to match the frequency of the master clock. This is most often done by using a voltage-controlled crystal oscillator (VCXO) to slightly vary the local oscillator. There are a number of disadvantages with this approach. In order to avoid the problem of over-correction, and hence loop stability problems, corrections to the VCXO need to be kept small, so as to not overshoot the desired final frequency. Thus, many successive timestamps need to be gotten from the control component thereby consuming many seconds or even minutes. The problem is further exacerbated by the slow response of the crystal. In addition, all of the components driving the VCXO are analog and thereby subject to temperature and aging problems as well as non-linearities.

Accordingly, the present invention provides a method and apparatus for synchronizing the local clock of a transceiver in a communications system with the master clock of its corresponding communications system control unit such that some of the problems associated with currently known synchronization methods are avoided.

In one embodiment of the present invention a method of synchronizing the local clock of a transceiver with the master clock of a control unit to which the transceiver is coupled is provided. The method of this embodiment comprises receiving a first timestamp with the transceiver, wherein the first timestamp comprises a signal generated by the control unit in response to the value of the master clock at the time the first timestamp signal is generated. Further, the method includes generating a first transceiver time reference with the transceiver device in response to the receipt of the first timestamp and generating a correction factor in response to the difference of the first timestamp and the first transceiver time reference. Finally, the method includes generating a synchronized downstream reference signal by adjusting an output clock signal of the local clock in response to the correction factor. In one embodiment of this method, the communications system is a cable modem system in which the transceiver is a cable modem, and the control unit is a headend unit. Further, the steps of generating a correction factor and generating a synchronized downstream reference signal are performed by digital logic in one embodiment.

In a further embodiment of the invention, the method further comprises receiving a second timestamp with the transceiver, wherein the second timestamp comprises a signal generated by the control unit in response to the value of the master clock at the time the second timestamp signal is generated and generating a second transceiver time reference with the transceiver device in response to the receipt of the second timestamp. A control unit difference time is then generated comprising the difference of the first and second timestamps. A transceiver difference time comprising the difference of the first and second transceiver time references is also generated in addition to a clock error time wherein the clock error time comprises the difference of the control unit difference time and the transceiver difference time. The correction factor in this embodiment is generated in response to the clock error time.

In another instance of the method, the first and second transceiver time references comprise time signals generated by the transceiver device in response to the values of the local clock at the times the first and second timestamps respectively are received.

In still another embodiment, the correction factor comprises an offset signal that corresponds to the clock error time divided by the transceiver difference time. In this embodiment, the offset signal is representative of the local clock error per local clock pulse. In generating the synchronized downstream reference signal, this embodiment of the method provides for adding the offset signal into an accumulator device on each pulse of the local clock and adjusting the output clock signal when the accumulator device rolls over.

The above embodiment can be further characterized in that the correction factor may also comprise an addsub signal that indicates if the local clock is either running faster or slower than the master clock. Given the value of the addsub signal, the local clock output can be adjusted either upward or downward accordingly.

In still another embodiment of the invention the method may comprise the further step of generating a synchronized upstream reference signal. In this instance, the synchronized upstream reference signal comprises a time signal utilized by the transceiver to determine when the transceiver can transmit a first output signal to the control unit such that the first output signal does not collide with a second output signal transmitted by one or more other transceivers in the system that are connected to the control unit. In one particular instance of this embodiment the step of generating the upstream reference signal comprises either adding or subtracting a delay offset time from the downstream reference signal. The delay offset time in this case comprises the amount of time required for a ranging time signal to be received by the transceiver after the ranging time signal is transmitted by the control unit.

In an alternate characterization of the present invention, the invention is described as a cable modem apparatus in a communications system comprising a headend unit including a master clock and a plurality of cable modems coupled to the headend unit. In this characterization, the cable modem apparatus comprises an input/output node coupled to the headend unit and a receiver that is coupled to the input/output node and that receives a first timestamp generated by the headend unit in response to the value of the master clock at the time the first timestamp signal is generated. The cable modem also includes a local clock configured to operate at substantially the same frequency as the master clock and a synchronization counter that is coupled to the receiver. The synchronization counter generates a first cable modem time reference in response to the receipt of the first timestamp, and it also includes a correction signal generator that generates a correction factor in response to the difference of the first timestamp and the first cable modem time reference and a correction circuit that generates a synchronized downstream reference signal by adjusting an output clock signal of the local clock in response to the correction factor. In this embodiment, the correction signal generator and the correction circuit may comprise digital logic.

In another embodiment, the correction circuit also generates a synchronized upstream reference signal. The synchronized upstream reference signal comprises a time signal utilized by the cable modem to determine when the cable modem can transmit a first output signal to the headend unit such that the first output signal does not collide with a second output signal transmitted by a different cable modem in the system. In one instance of this embodiment, the correction circuit generates the upstream reference signal by either adding or subtracting a delay offset time from the downstream reference signal. In one case, the delay offset time comprises the amount of time required for a ranging time signal to be received by the cable modem after the ranging time signal is transmitted by the headend.

In another embodiment, the invention can be further characterized in that the receiver receives a second timestamp that is generated by the headend unit in response to the value of the master clock at the time the second timestamp signal is generated. Also, the synchronization counter generates a second cable modem time reference in response to the receipt of the second timestamp. Lastly, the correction signal generator generates the correction factor in response to the difference of a headend difference time and a cable modem difference time. In this instance, the headend difference time comprises the difference of the first and second timestamps, and the cable modem difference time comprises the difference of the first and second cable modem time references.

In one instance of the above embodiment, the first and second cable modem time references comprise a time signals generated by the cable modem in response to the values of the local clock at the times the first and second timestamps are respectively received.

In still another embodiment, the correction factor comprises an offset signal that corresponds to the clock error time divided by the transceiver difference time. In this embodiment, the offset signal is representative of the local clock error per local clock pulse. In generating the synchronized downstream reference signal, this embodiment provides for adding the offset signal into an accumulator device on each pulse of the local clock and adjusting the output clock signal when the accumulator device rolls over.

The above embodiment can be further characterized in that the correction factor may also comprise an addsub signal that indicates if the local clock is either running faster or slower than the master clock. Given the value of the addsub signal, the local clock output can be adjusted either upward or downward accordingly.

Lastly, the present invention may also be characterized as an apparatus for synchronizing the local clock of a transceiver that is coupled to a control unit with the master clock of the control unit. In this characterization, the apparatus comprises a means for receiving a first timestamp, wherein the first timestamp comprises a signal generated by the control unit in response to the value of the master clock at the time the first timestamp signal is generated. Also included is a means for generating a first transceiver time reference in response to the receipt of the first timestamp, a means for generating a correction factor in response to the difference of the first timestamp and the first transceiver time reference, and a means for generating a synchronized downstream reference signal that comprises an output clock signal of the local clock adjusted in response to the correction factor. In one instance, the transceiver device comprises a cable modem and the control unit comprises a headend unit. In a further instance of this embodiment, the means for generating a correction factor and the means for generating a synchronized downstream reference signal comprise digital logic.

A further embodiment of this apparatus includes a means for generating a synchronized upstream reference signal. In one case, the synchronized upstream reference signal comprises a time signal utilized by the transceiver to determine when the transceiver can transmit a first output signal to the control unit such that the first output signal does not collide with a second output signal transmitted by another transceiver in the system. In one instance of this embodiment, the generation of the upstream reference signal comprises either adding or subtracting a delay offset time from the downstream reference time. The delay offset time in one case comprises the amount of time required for a ranging time signal to be received by the transceiver after the ranging time signal is transmitted by the control unit.

In still another embodiment, the correction factor is generated in response to the value of a clock error time, and the apparatus also includes a means for receiving a second timestamp, wherein the second timestamp comprises a signal generated by the control unit in response to the value of the master clock at the time the second timestamp is generated. Also included in this embodiment are a means for generating a second transceiver time reference in response to the receipt of the second timestamp, a means for generating a control unit difference time comprising the difference of the first and second timestamps, a means for generating a transceiver difference time comprising the difference of the first and second transceiver time references, and a means for generating the clock error time wherein the clock error time comprises the difference of the control unit difference time and the transceiver difference time.

In still another embodiment, the correction factor comprises an offset signal that corresponds to the clock error time divided by the transceiver difference time. In this embodiment, the offset signal is representative of the local clock error per local clock pulse. In generating the synchronized downstream reference signal, this embodiment of the apparatus includes a means for adding the offset signal into an accumulator device on each pulse of the local clock and a means for adjusting the output clock signal when the accumulator device rolls over. The above embodiment can be further characterized in that the correction factor may also comprise an addsub signal that indicates if the local clock is either running faster or slower than the master clock. Given the value of the addsub signal, the local clock output can be adjusted either upward or downward accordingly.

Other aspects and advantages of the present invention can be seen upon review of the figures, the detailed description, and the claims which follow.

3. A BRIEF DESCRIPTION OF THE FIGURES

The figures illustrate the invention by way of example, and not limitation. Like references indicate similar elements.

Figure 8:
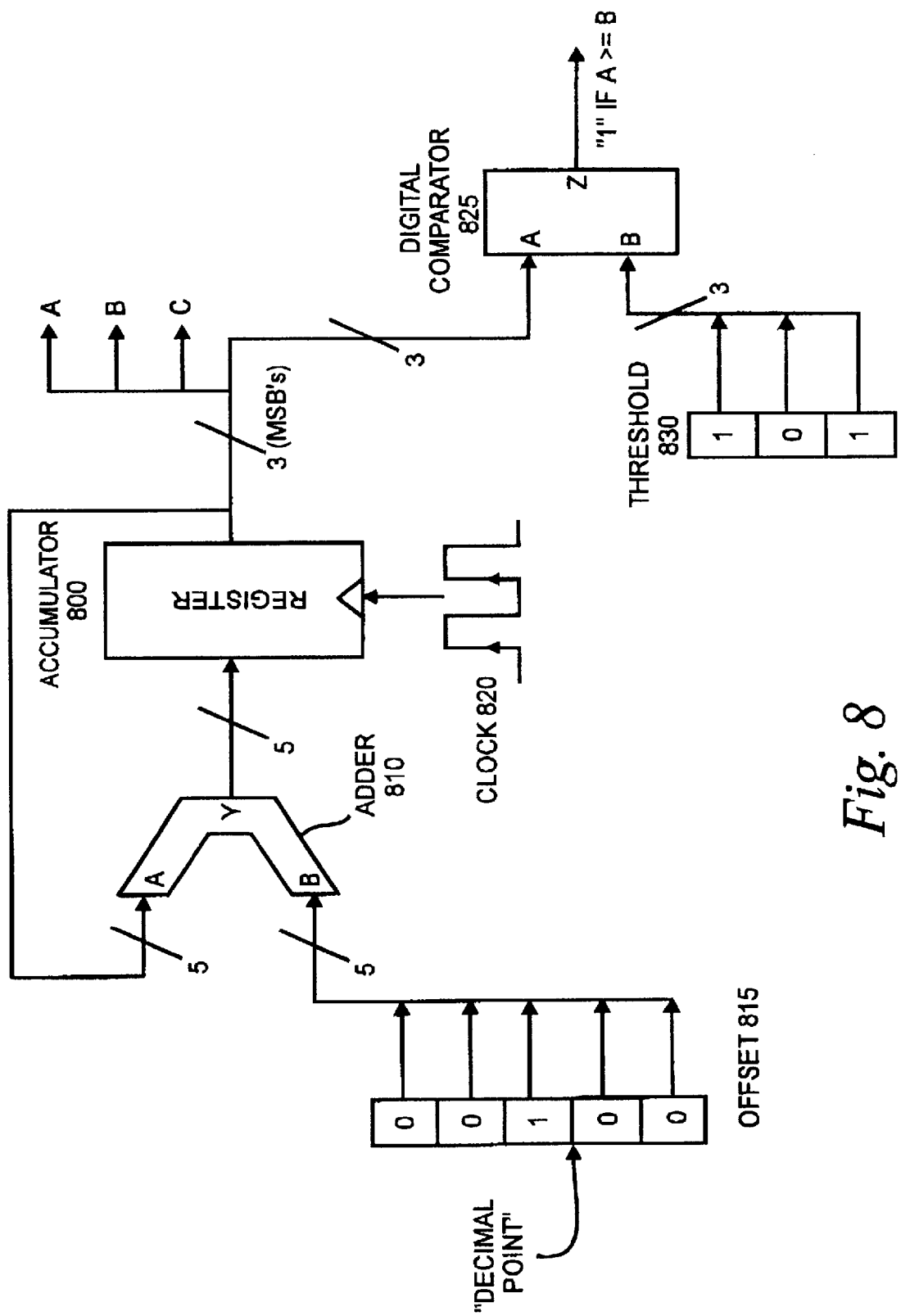
FIG. 8 illustrates still another embodiment of a simplified logic circuit which can be utilized to provide a clock signal to a cable modem in accordance with the present invention.
Figures 9A, 9B, 9C:
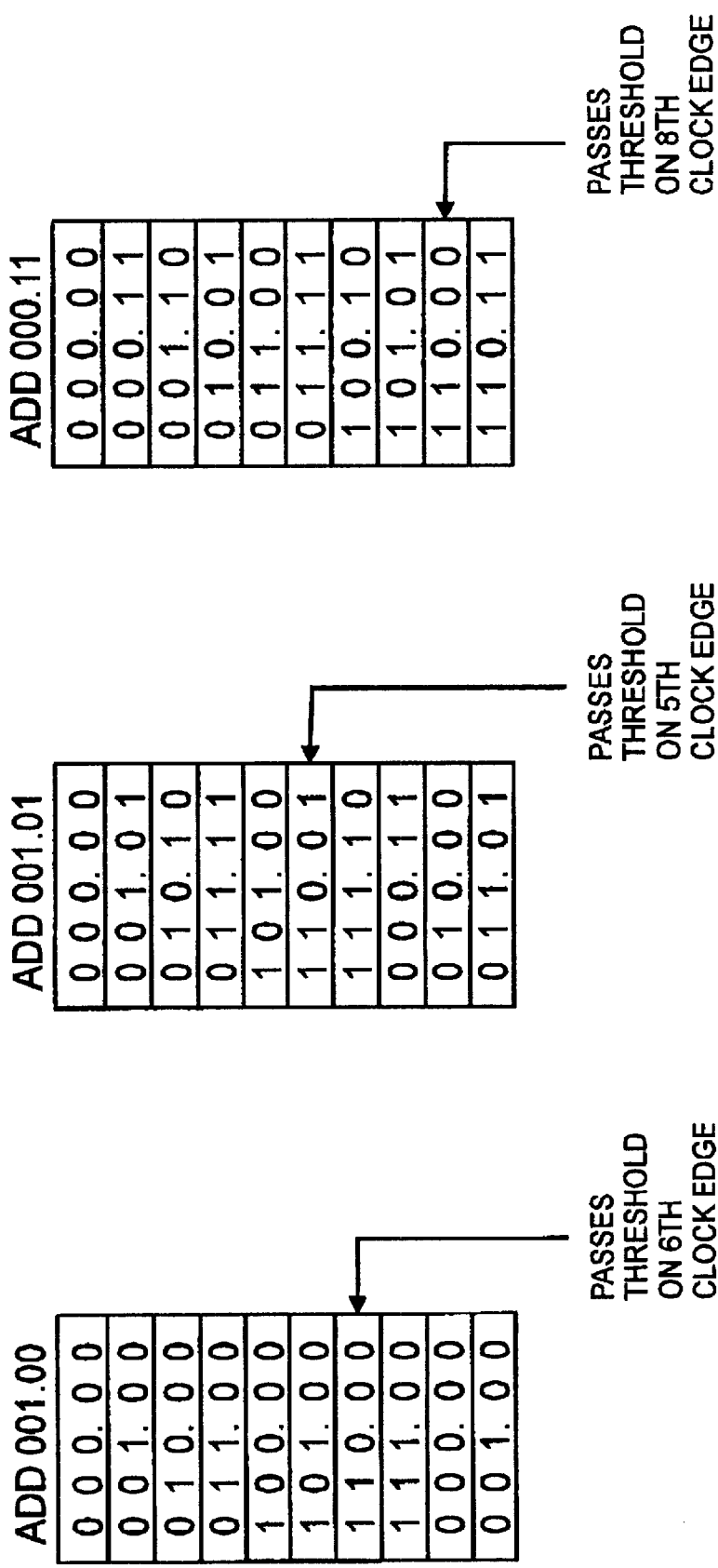

FIGS. 9(a), 9(b), and 9(c) illustrate how the clock signal circuit of FIG. 8 can be utilized to provide faster and slower clock signals utilizing a number of different offset values.

Figure 10:
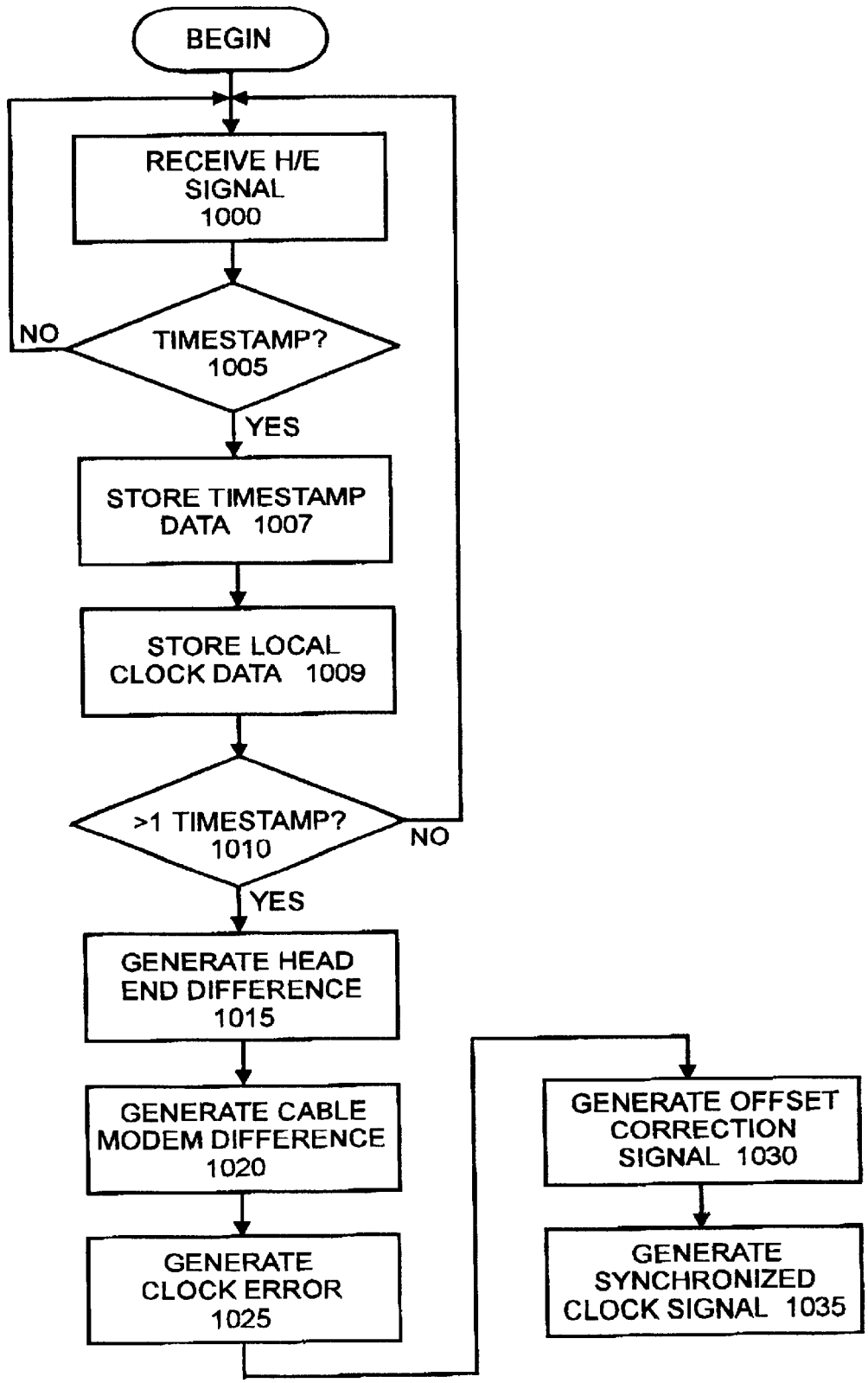

FIG. 10 illustrates a simplified process flow diagram representing a method by which a cable modem clock signal can be synchronized in accordance with one embodiment of the invention.

Figure 11:
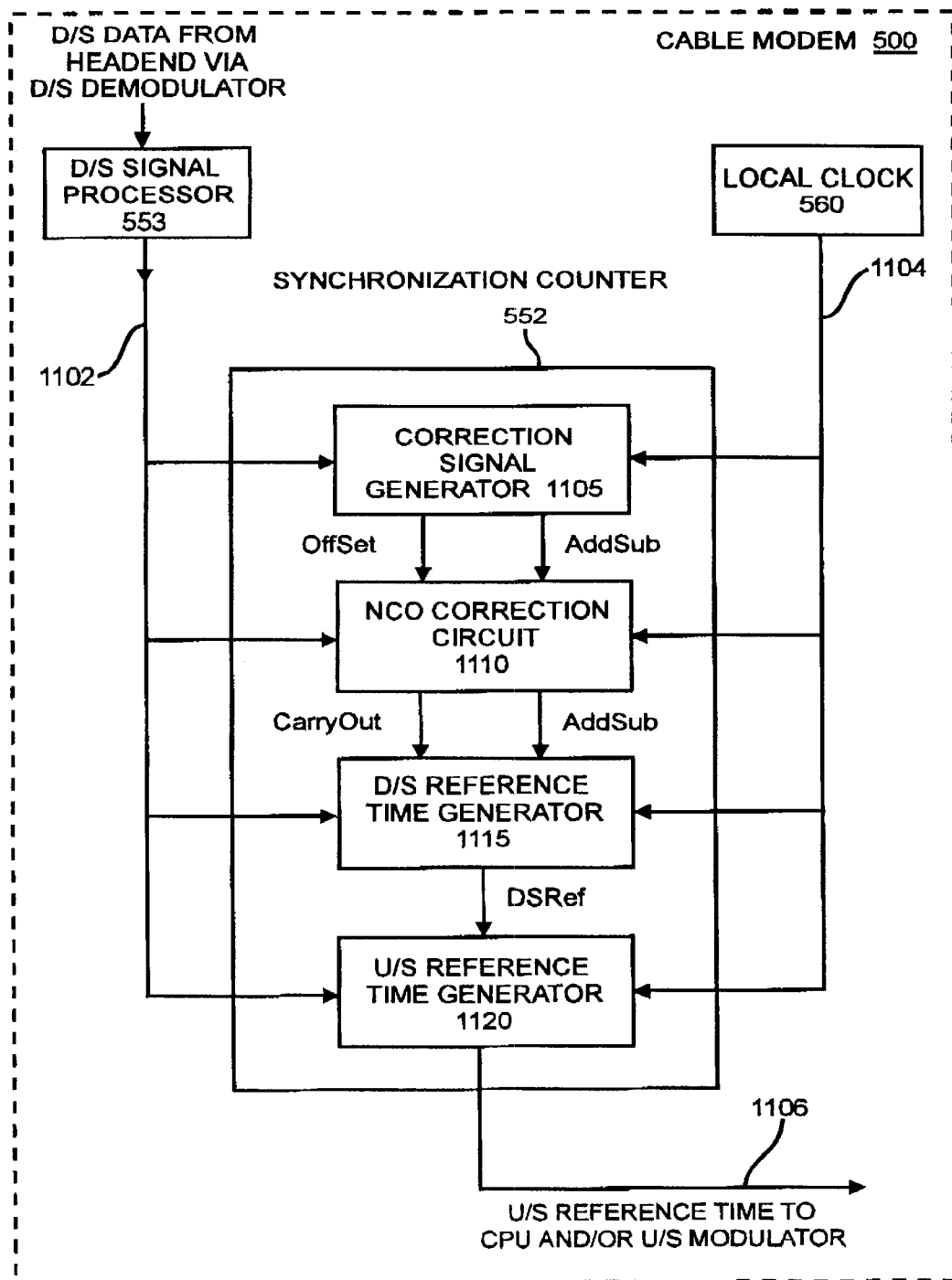

FIG. 11 illustrates, in simple block diagram form, one embodiment of an apparatus which can perform the synchronization method of FIG. 10.

Figure 12:
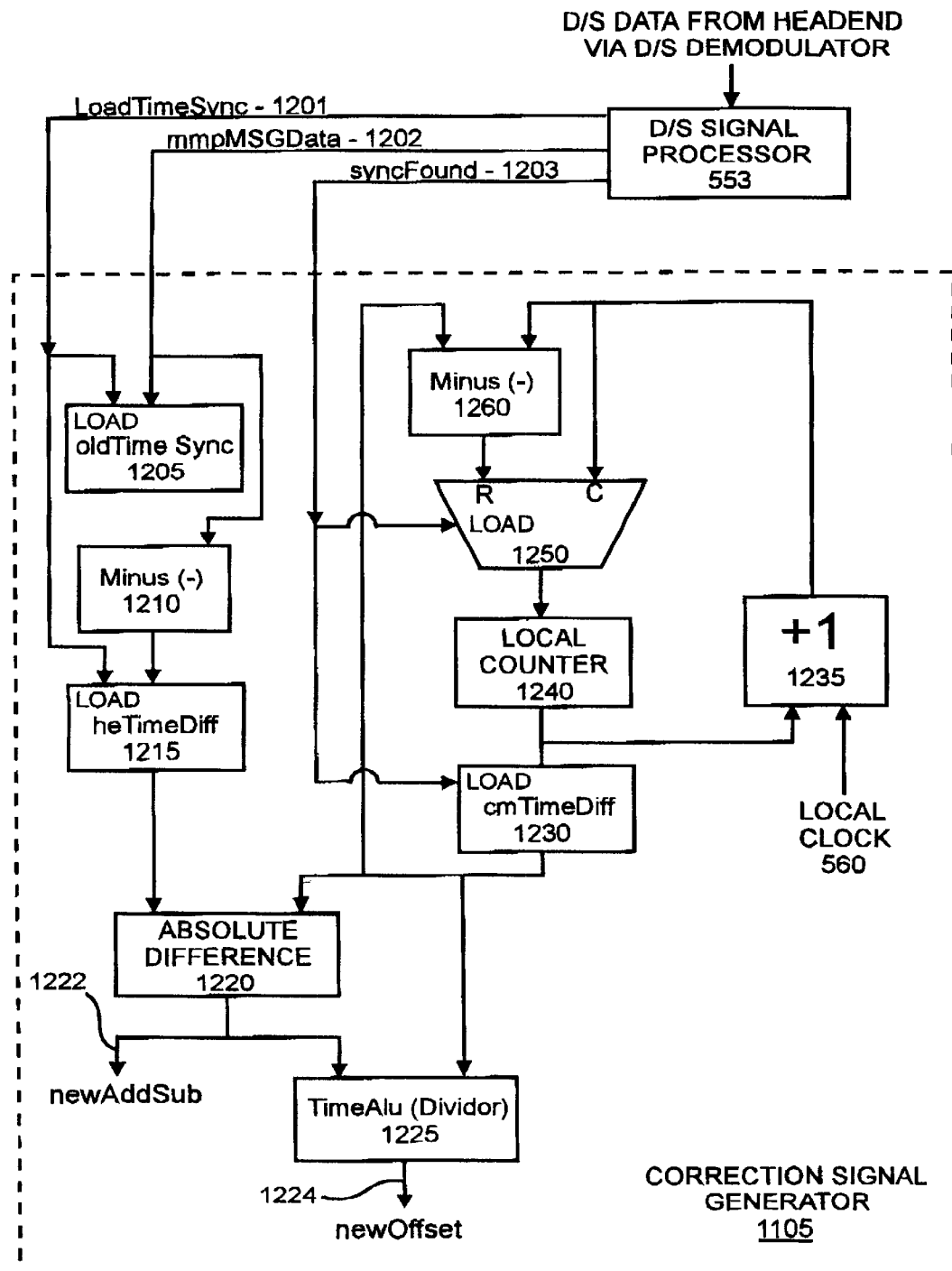

FIG. 12 illustrates logic circuitry which may be used to implement one portion of the apparatus of FIG. 11.

Figure 13:
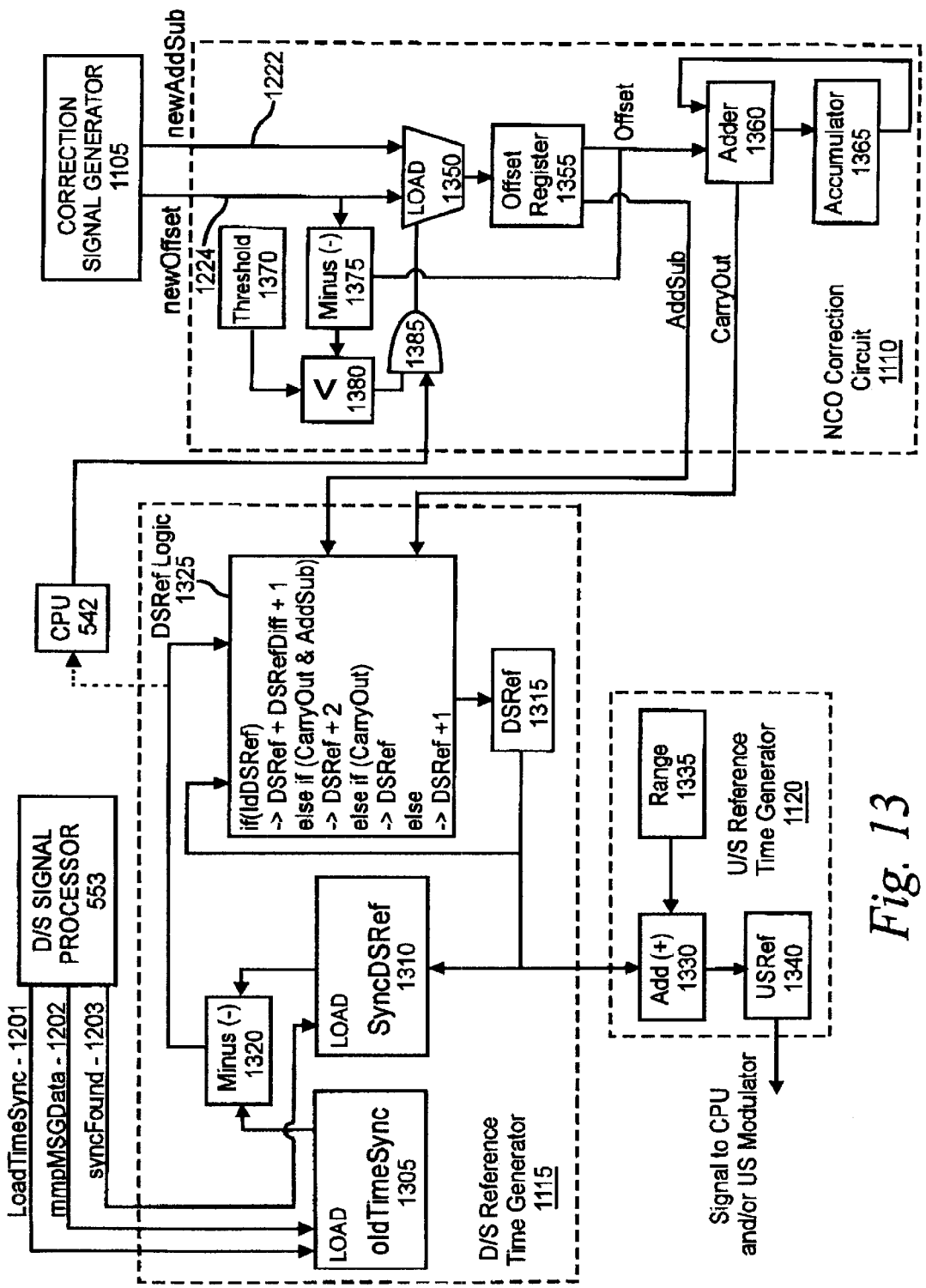

FIG. 13 illustrates further logic circuitry which may be used to implement other portions of the apparatus of FIG. 11.

4. DETAILED DESCRIPTION

This invention avoids the analog approach of the VCXO entirely. For, in one embodiment the present invention synchronizes the clock of a local cable modem with that of the headend by following the basic method described below. Two successive timestamps are taken from the headend and compared to two local time samples from the local cable modem clock. These 4 measurements are used to compute an offset frequency that can be added or subtracted from the local clock to derive a new local clock frequency that is in perfect synchronization with the Headend. This is all done digitally, thus avoiding any non-idealities connected with analog hardware. Furthermore, no modification is required on the relatively inexpensive basic crystal oscillator typically used in cable modems. In one embodiment, the basic concept employs an architecture based on a numerically-controlled oscillator (NCO), of the type employed in direct-digital synthesizers (DDS). This concept is explained more fully below in which a detailed description of preferred embodiments is provided with respect to the figures.

Figure 5:
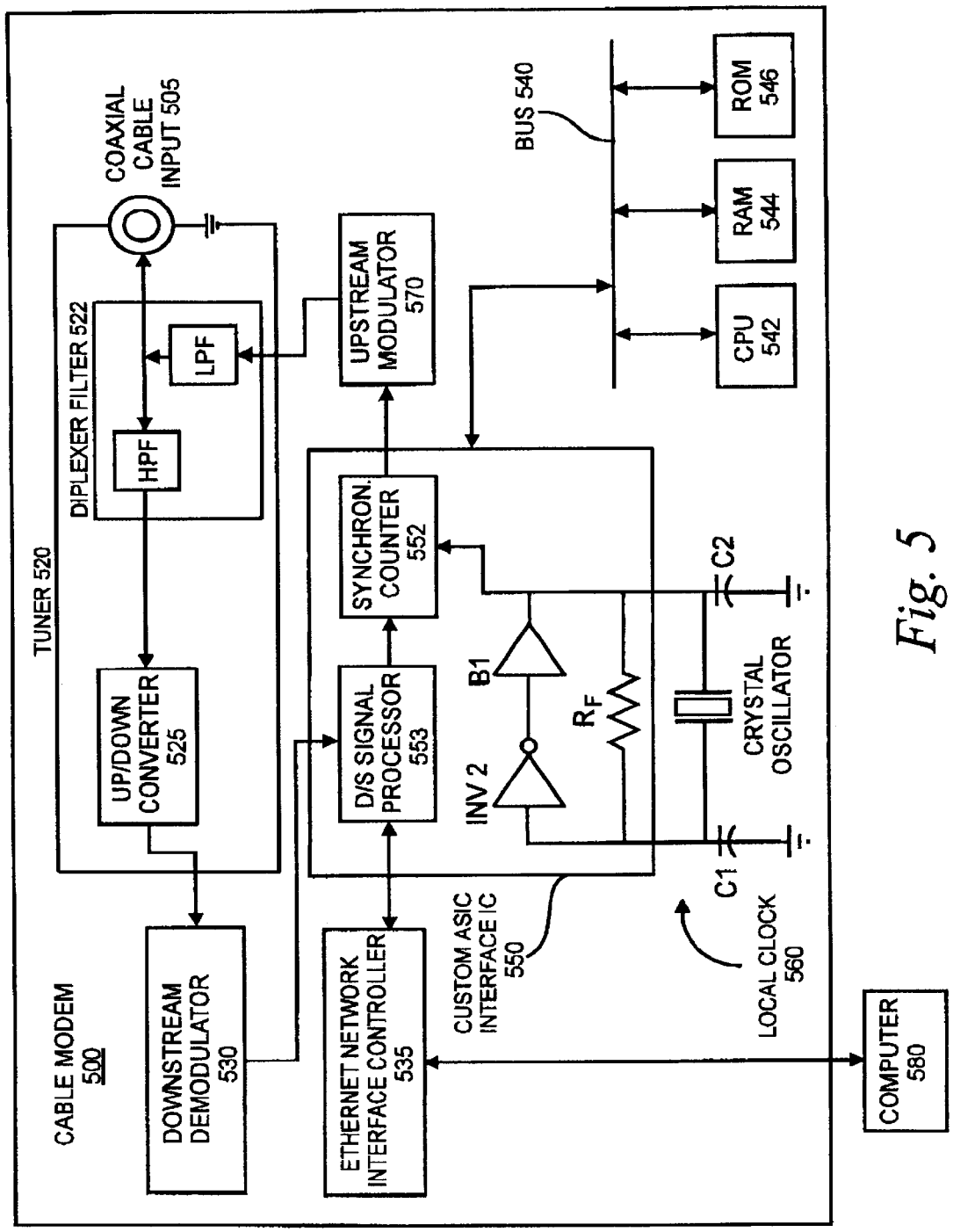
FIG. 5 illustrates, in block diagram form, a typical cable modem in which one embodiment of the invention is utilized to synchronize the clock of the cable modem with the clock of the headend.

FIG. 5 illustrates a block diagram of a two-way cable modem 500 that operates in accordance with one embodiment of the present invention. The cable modem 500 is coupled to an external computer 580, and includes a coaxial cable input/output 505, a tuner 520, a downstream demodulator 530, an Ethernet network interface controller 535, a custom ASIC Interface integrated circuit 550, a local clock 560, an upstream modulator 570, a CPU 542, a RAM 544, and a ROM 546. The tuner 520 is comprised of a diplexer filter 522 including a high pass and low pass filter, and an up/down frequency converter 525. The diplexer filter 522 (highpass/lowpass) which is coupled to the input/output 505 of the modem 500 separates the low power, high frequency downstream signal coming from the headend 200, from the high power, lower frequency upstream signal generated by the cable modem 500 itself. In one embodiment of the cable modem 500, the downstream signal is a 64-QAM or 256-QAM signal in a frequency range of 54–850 MHz with a power level of between −15 dBmV and +15 dBmV—the upstream signal covers a frequency range of 5–42 MHz with power levels ranging between +8 dBmV and +58 dBmV.

The tuner 520 is coupled to and receives modulated data from the upstream modulator 570 to be transmitted upstream to the headend 200. This data passes through the low pass filter of the diplexer filter 522 and is output through the coaxial cable input/output 505. The cable modem 500 receives modulated downstream input data from the cable headend 200 via the coaxial cable input/output 505. This downstream input data passes through the tuner 520 via the high pass filter of the diplexer filter 522 and then through the up/down converter 525. The output of the up/down converter 525 is received by the downstream demodulator 530 which demodulates the downstream input data.

The custom ASIC Interface integrated circuit 550 is coupled to the downstream demodulator 530, the upstream modulator 570, and the Ethernet network interface controller 535 such that data can be passed to and from these components. Further, the custom ASIC Interface integrated circuit 550 is coupled to the CPU 542, the RAM 544, and the ROM 546 through the internal modem bus 540. The custom ASIC Interface integrated circuit 550 contains circuitry which, in conjunction with command signals generated by the CPU 542, serves to control the overall operation of the cable modem 500. The RAM 544 and the ROM 546 of the cable modem 500 serve to store, read, and write data to be utilized by the modem 500, and to store operating instructions and configuration data for the modem 500.

Figure 1:
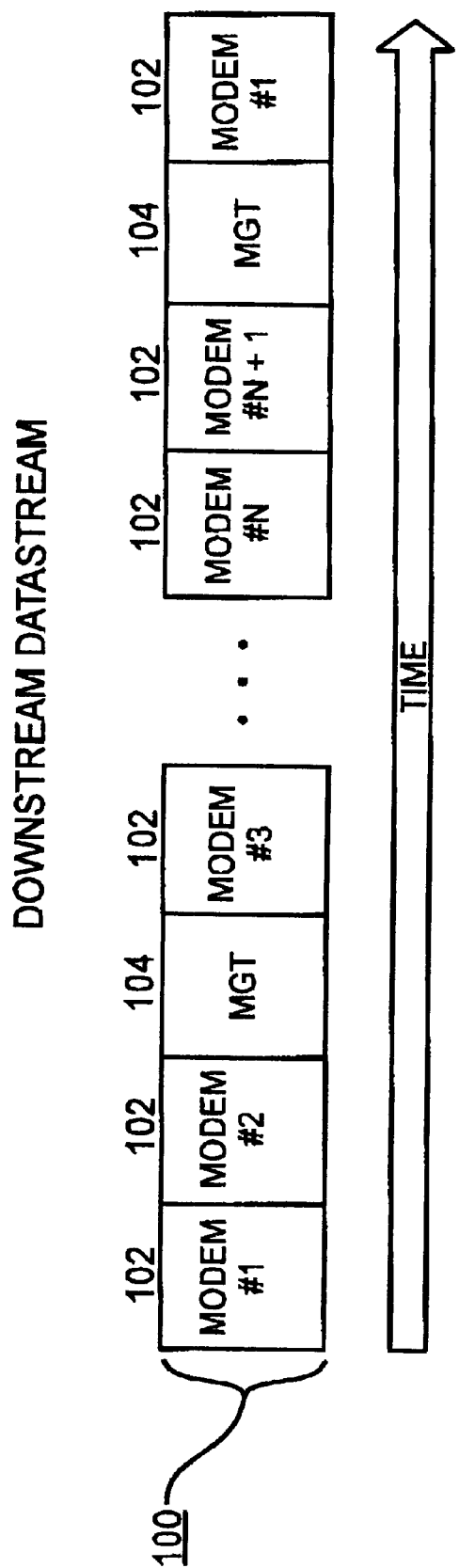
FIG. 1 illustrates, in simplified form, a typical downstream datastream from the headend of a typical cable modem system.
Figure 2:
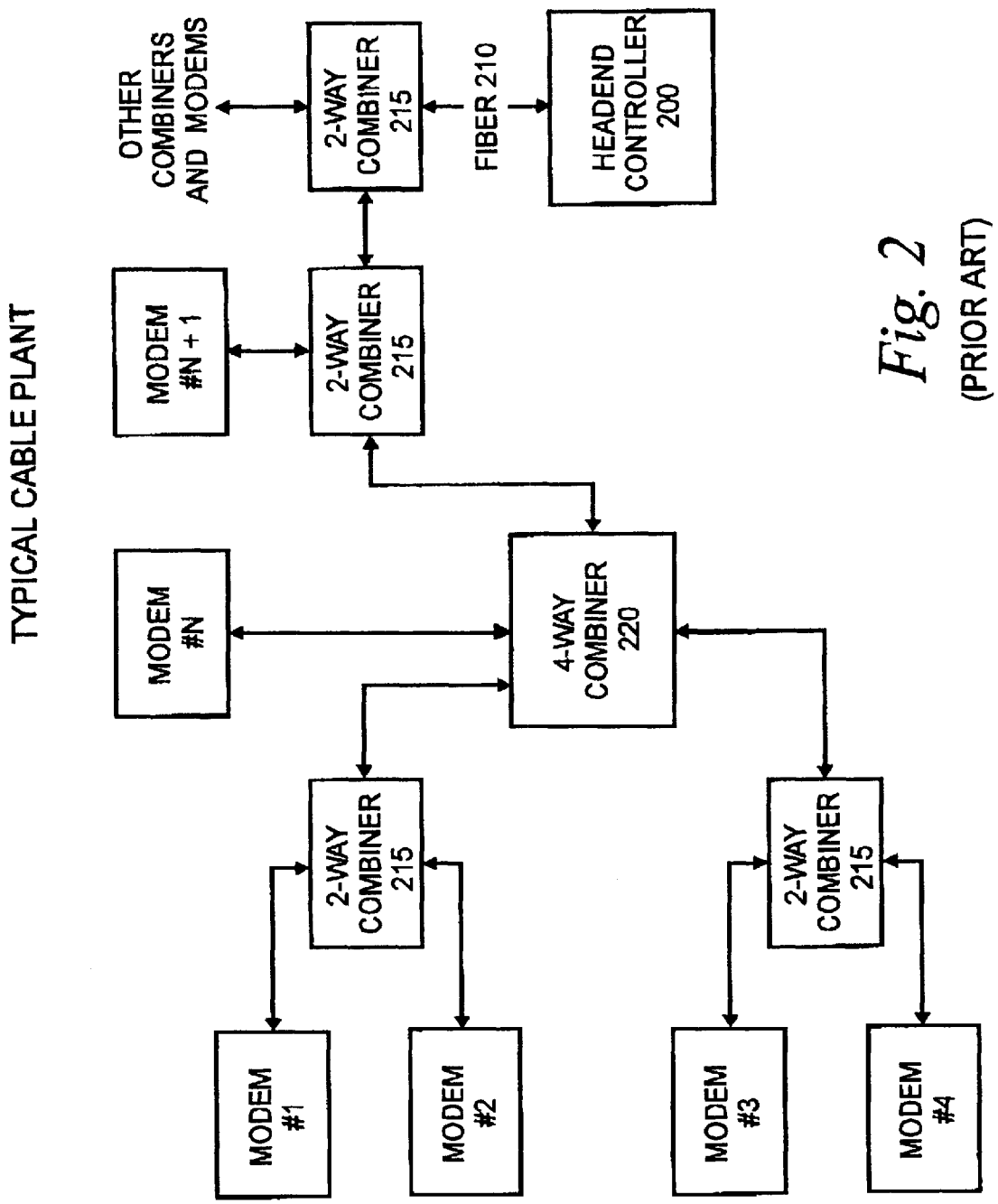
FIG. 2 illustrates, in block diagram form, a typical cable plant for a cable modem system.
Figure 3A:
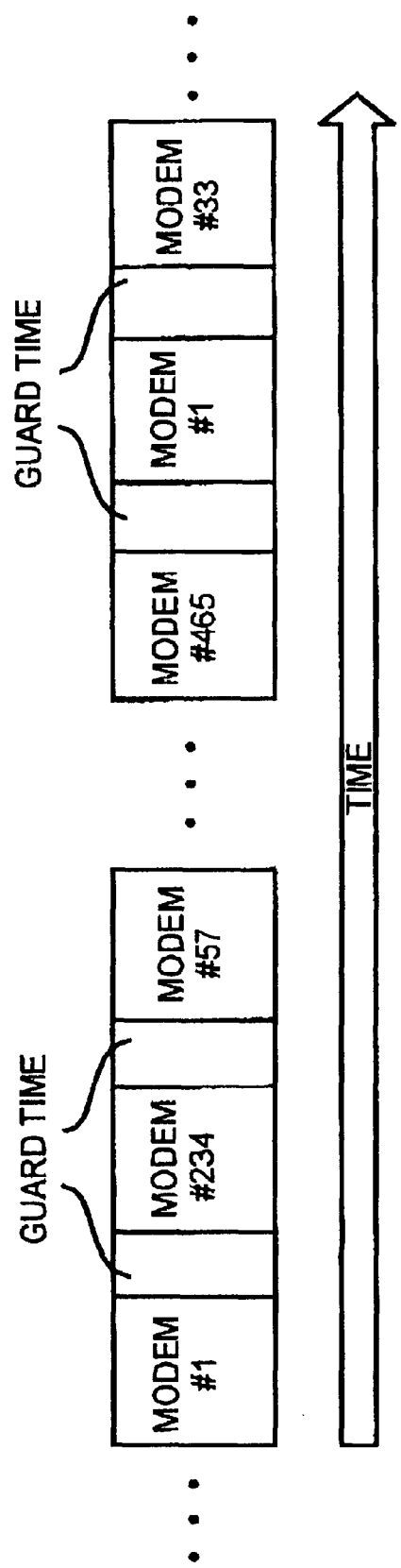
FIG. 3(a) illustrates, in simplified form, a typical upstream datastream to the headend of a typical cable modem system.
Figure 3B:
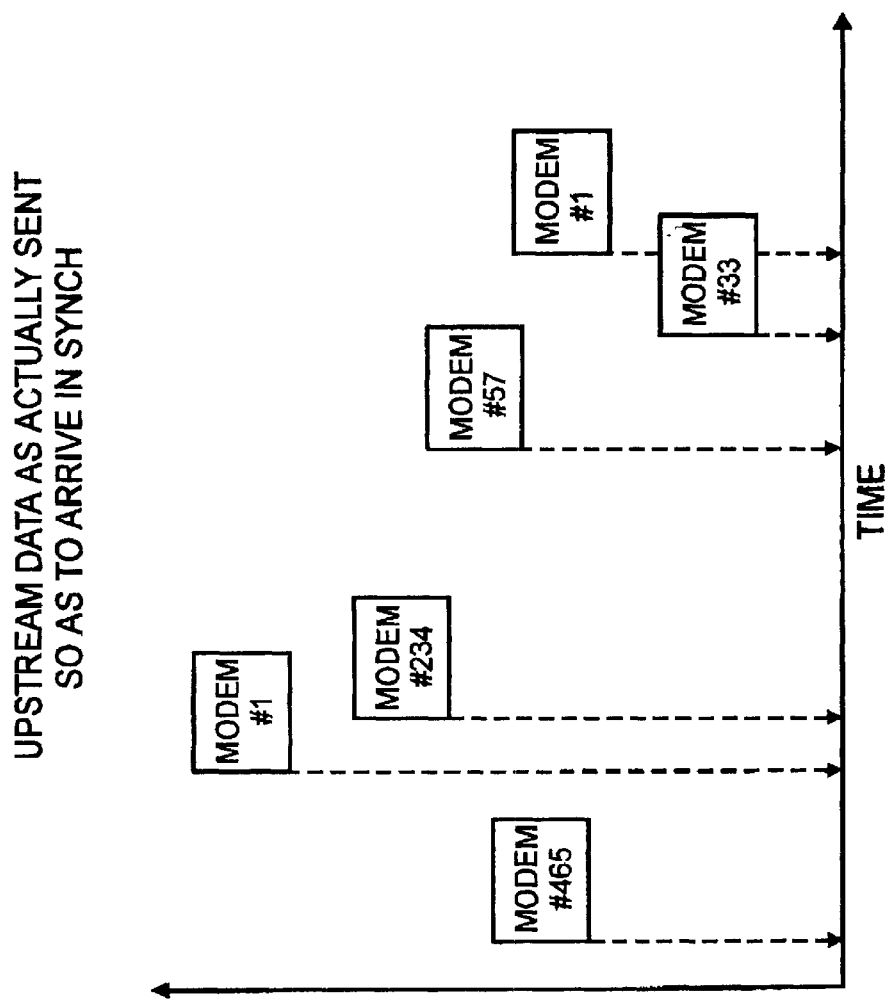
FIG. 3(b) illustrates, in simplified form, a time chart displaying the relative times that a number of modems would have to send their data to the headend so as to arrive at the headend as illustrated in FIG. 3(a).
Figure 4A:
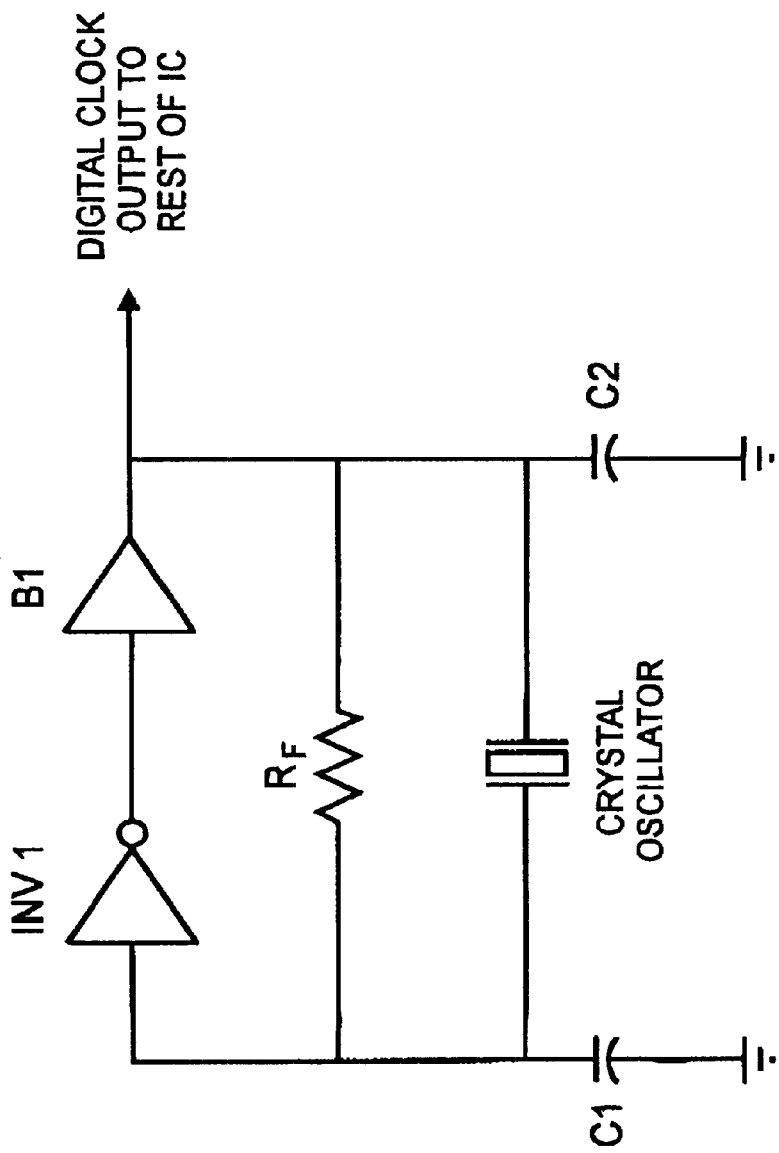
FIG. 4(a) illustrates, in schematic form, a typical standard crystal oscillator circuit used to generate a clock signal for a cable modem.
Figure 4B:
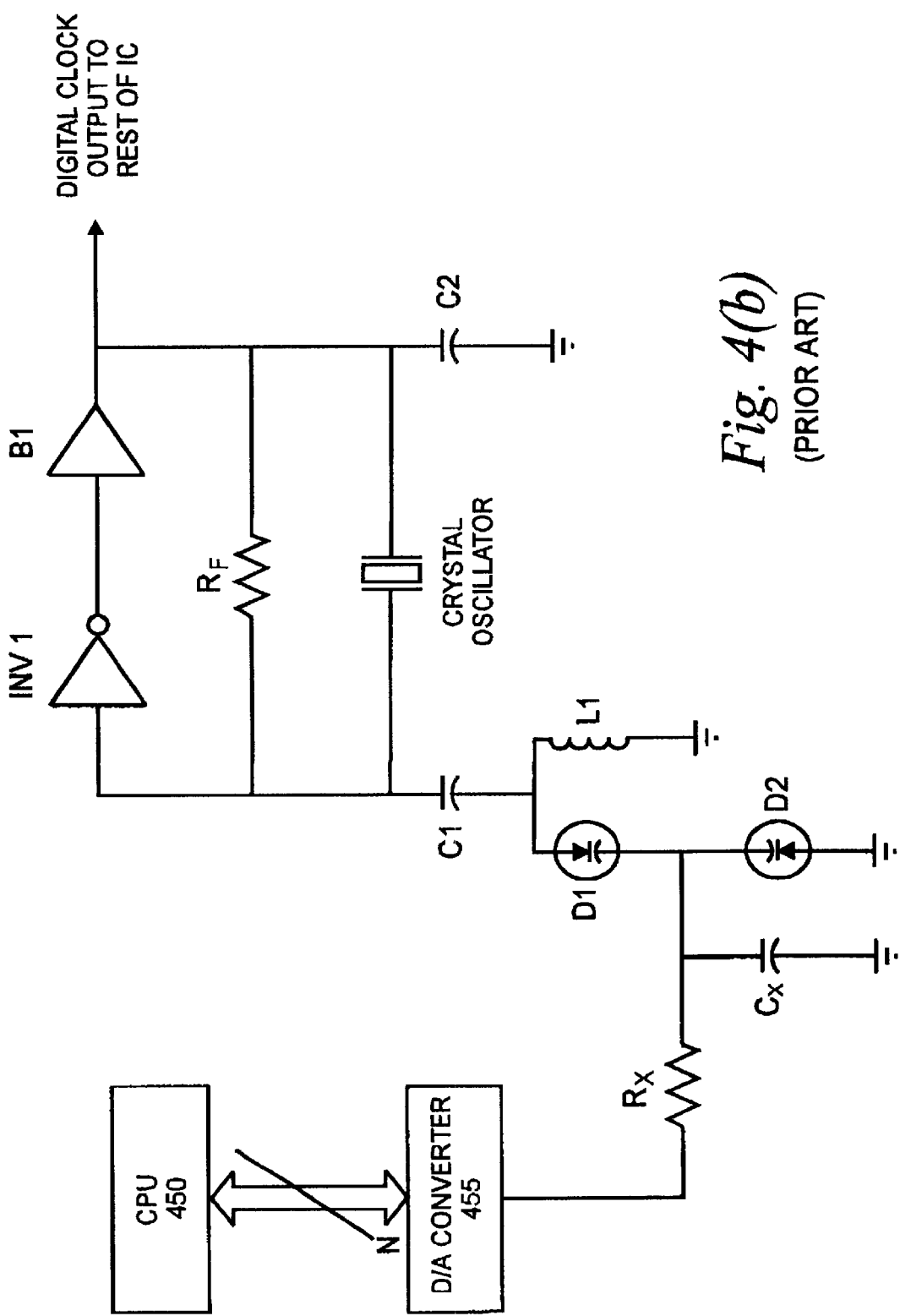
FIG. 4(b) illustrates, in schematic form, the standard crystal oscillator circuit of FIG. 4(a) modified by a voltage controlled oscillator circuit to allow for variable frequency control of the crystal oscillator.

Also contained in the custom ASIC Interface integrated circuit 550 is a synchronization counter 552 and a D/S signal processor 553. The D/S signal processor receives input from the D/S demodulator 530, and performs a number of functions in response to this input. The D/S signal processor 553 may pass on the raw data signal on to the rest of the ASIC 550 and it may also generate signals in response to the data received. For instance, in one embodiment, the D/S signal processor 553 may generate a number of logic level signals when it detects a timing type of signal from the headend 200 of the cable modem system. The synchronization counter 552 operates in accordance with one embodiment of the present invention to synchronize the cable modem clock with the clock of the headend 200. The synchronization counter 552 receives input from a standard crystal oscillator circuit such as that shown in FIG. 4(*a*) and also shown as local clock 560, and from the D/S signal processor 553, and corrects this clock output to match that of the headend 200 as will be described later in more detail with respect to FIGS. 10–13.

The cable modem 500 is coupled to an external computer 580 such as a personal desktop computer via the ethernet network interface controller 535. In the illustrated embodiment, the custom ASIC Interface integrated circuit 550 may interface with the computer 580 through the ethernet network interface controller 535 when it is time to send data to the headend 200 of the cable modem system. This data can then be sent from a typical storage medium in the computer 580 (such as from a RAM, a ROM, an EEPROM, a floppy disk drive, or a CDROM) and into the custom ASIC Interface integrated circuit 550 where it is then passed to the upstream modulator 570 and the low pass filter of the diplexer filter 522 before being transmitted to the cable system headend 200 via the coaxial cable input/output 505. Further, demodulated downstream input data from the downstream demodulator 530 may be sent to the computer 580 via the custom ASIC Interface integrated circuit 550 and the ethernet network interface controller 535. This demodulated downstream input data may then be stored and/or utilized by the computer 580 to perform a number of computing operations in accordance with software programs being run on the computer 580.

Figure 6:
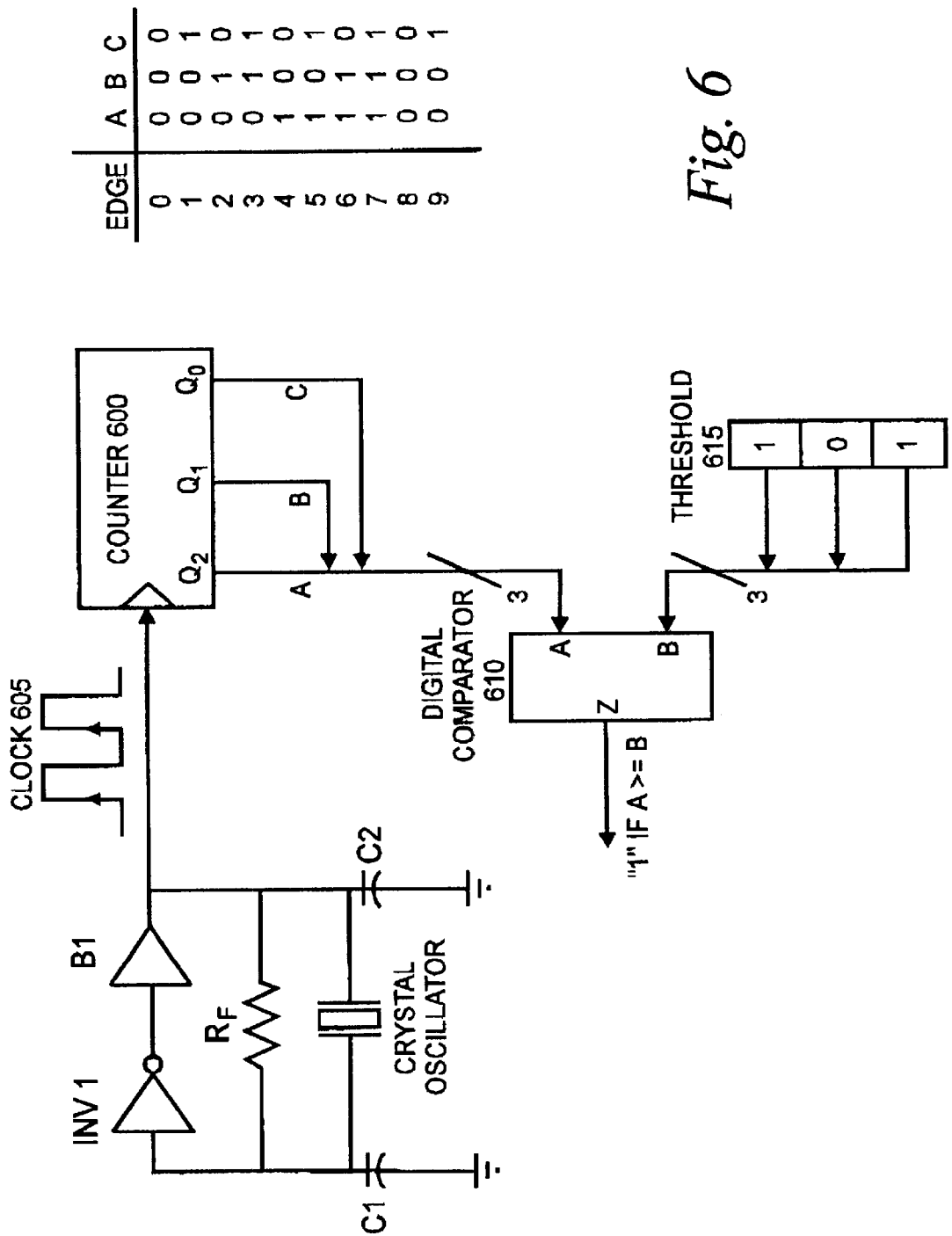
FIG. 6 illustrates one embodiment of a simplified logic circuit which can be utilized to provide a clock signal to a cable modem in accordance with the present invention.

FIG. 6 illustrates a circuit which displays one known method in which a clock reference may be built. This circuit simply comprises a counter 600 which is incremented in a binary fashion each time a rising edge of clock 605 comes along. The clock 605 is shown as the output of buffer B1 of the standard crystal oscillator circuit of FIG. 4(*b*). In this example, the counter is a 3-bit binary counter. The maximum count is dictated by the number of bits in the counter (which is 111 binary or 7, in this example). When the count reaches its maximum value, it will roll over to a count of zero on the next rising edge. With such a counter, we can use a digital comparator 610 to tell a CPU associated with a cable modem (such as the CPU 542 of FIG. 5) when it is time to send another packet upstream U/S. This can be done by providing the output of counter 600 to input A of digital comparator 610, and providing a threshold 615 binary value as the input B of digital comparator 610 where the threshold value is representative of the particular modem's upstream timeslot. Thus, in other words, when the counter 600 reaches a value that is greater than the threshold 615, the digital comparator 610 may output a signal to the CPU of the modem telling it that it is time to send upstream data (if there is any to send).

Figure 7:
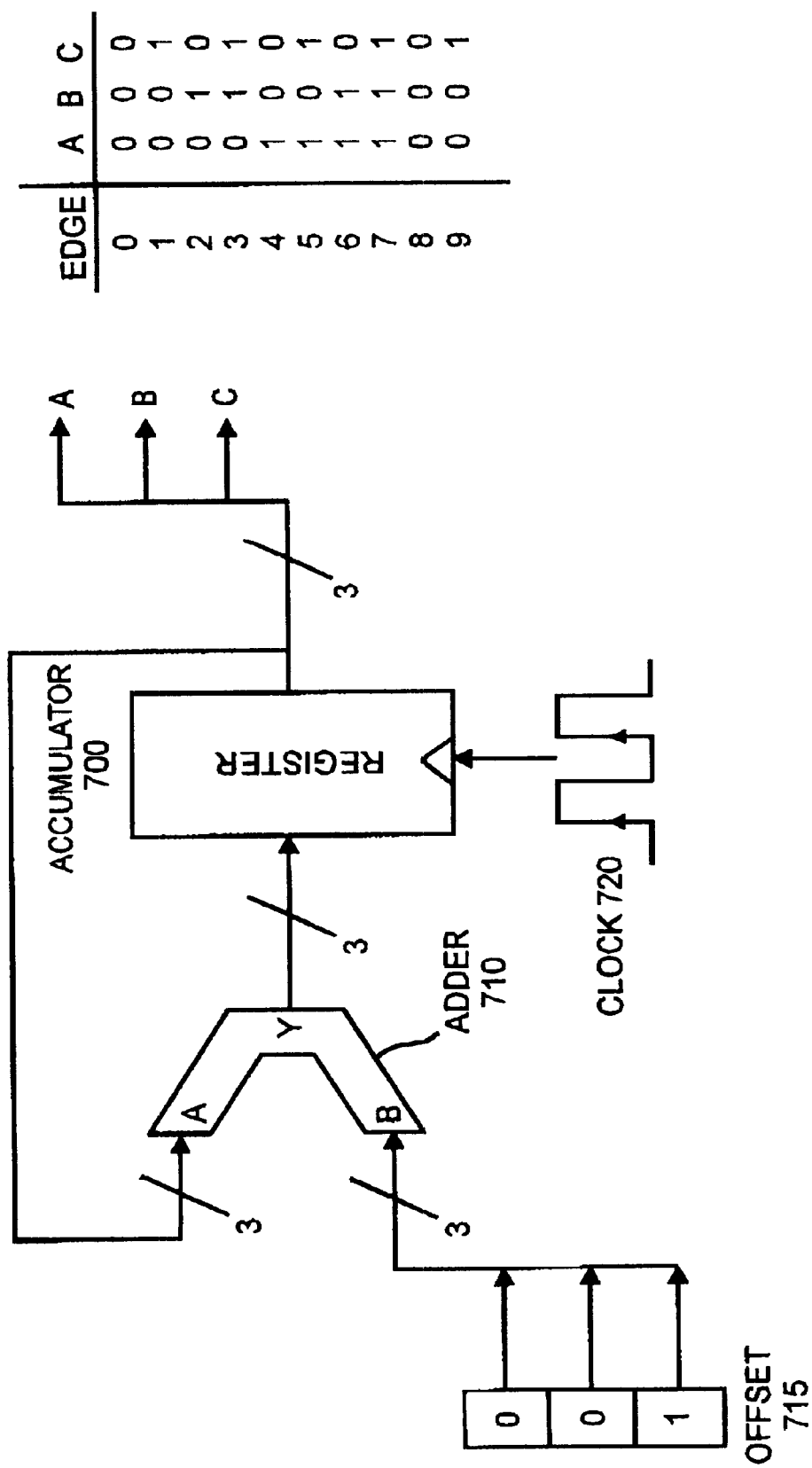
FIG. 7 illustrates another embodiment of a simplified logic circuit which can be utilized to provide a clock signal to a cable modem in accordance with the present invention.

FIG. 7 illustrates a circuit embodying an alternative way to provide a reference clock. In this circuit, the standard binary counter of FIG. 6 is replaced with an N-bit accumulator 700. In the illustrated case, the accumulator 700 is shown as a 3-bit accumulator. In this circuit, a digital adder 710 is used to add the last accumulator 700 value with an offset 715 (in this case the offset =1). The accumulator 700 output is fed back to one of the adder 710 inputs, so that on the next positive edge of the clock 720, a new value is latched on the output. The clock 720 is, as was the case in FIG. 6, the output of buffer B1 of the standard crystal oscillator circuit of FIG. 4(*b*). If the offset added is always 1, then the count will increment by one each time just as it did with the standard binary counter of FIG. 6. As expected, the count rolls over once it reaches 111 binary or 7.

With the accumulator circuit of FIG. 7, one could increment by an amount other than one. If one added a fixed offset of 10 binary, or 2, each time, the accumulator circuit of FIG. 7 would cycle through the maximum count in ½ the time. Similarly, incrementing with 11 binary or 3 would cause the accumulator to cycle 3 times as fast. This action forms the basis for numerically controlled oscillator (NCO) operation, where in more realistic cases the accumulator will have 24 or more bits. With this many bits and a clock frequency of a few 10's of MHz, frequency resolution can be as small as a few Hz. In fact, if one assumes that the binary output of the accumulator 700 corresponds to a phase angle, and this phase angle is fed to a sine look-up table, which is in turn fed to a digital-to-analog converter, then one has formed a direct digital synthesizer (DDS).

One way to adjust the rate at which the counters of FIGS. 6 and 7 count is by changing the frequency of the clock. Of course this is what currently known methods such as the VCXO of FIG. 4(*b*) do. A new way to change the frequency is shown in FIG. 8. The circuit of FIG. 8 is a numerically controlled oscillator (NCO) comprising a 5-bit accumulator 800, an adder 810, an offset 815, a digital comparator 825, and a threshold 830. The circuit works similar to the accumulator circuit of FIG. 7 with the following exceptions. In this implementation of the NCO, the offset 815 is a 5-bit offset wherein some bits are utilized such that they are effectively "behind a decimal point", specifically 2 bits in this example. Only the 3 Most Significant Bits (MSB's) are fed from the accumulator 800 to other parts of the system such as the digital comparator 825. The 2 bits below the decimal point are only used for internal calculations within the accumulator 800. If one adds slightly more than one, say an offset 815 of 001.01 to the count on each clock 820 edge, the NCO will cycle through its maximum count in less clock cycles than if one were to add an offset 815 of 001.00 on each clock 820 edge. Similarly, one can make the NCO cycle through its maximum count more slowly by adding in an offset slightly less than one on each clock cycle.

The action of the NCO with various offsets is shown in FIGS. 9(a)–(c). Note that in FIG. 9(a), the offset is 001.00 and the output of the accumulator 800 passes the threshold 830 on the 6th clock edge. Note that in FIG. 9(b), the offset is slightly higher than that of FIG. 9(a) at 001.01 and the output of the accumulator 800 passes the threshold 830 more quickly—on the 5th clock edge. Finally, note that in FIG. 9(c), the offset is slightly lower that of FIG. 9(a) at 000.11 and the output of the accumulator 800 passes the threshold 830 more slowly—on the 8th clock edge.

In one embodiment of the current invention, a version of the NCO concept described above with respect to FIGS. 8–9 is utilized to create a synchronization counter 552 that mirrors the time synchronization counter in the headend 200 of the cable modem system. This is illustrated by the process flow diagram of FIG. 10. Thus, at block 1000 a headend signal is received by the cable modem 500 from the headend 200. The headend signal is received by the D/S signal processor 553 via the D/D demodulator 530 and analyzed to detect any timing signals as shown by decision block 1005. Upon detecting a timestamp signal, the cable modem 500 stores the timestamp data 1007 and the local clock data 1009 corresponding to the time the timestamp is received. In one embodiment of the invention, a timestamp signal is broadcast to the cable modem system by the headend 200 at an interval of from 200–600 milliseconds. As shown at decision block 1010, if only one timestamp signal had been received by the cable modem 500 since a certain event such as power on or a reset, then the cable modem 500 continues to wait for a second timestamp signal from the headend 200. When a second timestamp signal arrives, a headend time difference (heTimeDiff) is computed by subtracting the received timestamps stored at block 1007 as shown at block 1015. A cable modem difference (cmTimeDiff) is computed by counting the clocks between the timestamps, which in one embodiment is performed by taking the difference in the local clock data stored at block 1009.

The process continues at block 1025 in which a clock error is generated. The difference between the cmTimeDiff and heTimeDiff is the clock error (clkErr). The clkerr represents the number of clocks that the headend 200 clock is ahead or behind the local clock of the cable modem 500. In one embodiment of the invention, the local clock of the cable modem is a 10.248 mhz clock such as that illustrated in FIG. 4(a). At block 1030, a correction signal is then generated. The correction signal is generated by dividing the clkerr by the cmTimeDiff. The correction signal includes an Offset signal and an AddSub signal, and in one embodiment is a 24 bit signal. The Offset signal represents the clock difference per clock, and the AddSub signal represents whether the local clock of the modem 500 is faster or slower than the headend 200 clock. The Offset signal, in one embodiment, can be averaged over time to gain a stable Offset signal that removes small amounts of jitter and noise from the signal.

Once a stable Offset signal is achieved, it is programmed into the modem in order to carry out the final step of the process. Thus, at block 1035, the synchronization counter 532 of the cable modem 500 generates a synchronized clock signal by utilizing the generated correction signal. In one embodiment, this is performed by adding the Offset value into an accumulator on every 10.248 mhz clock. Thus, when the accumulator rolls over, a single clock of difference exists between the modem 500 and the headend 200. This clock of error can then be removed from the modem's time synchronization counter 552 by skipping or it can be added by incrementing the count by 2—the determination whether to skip or increment by 2 is decided by the value of the AddSub portion of the correction signal which, as stated previously, indicates whether the local clock is faster or slower than the headend 200 clock. With this approach, the time synchronization counter 552 should never be off by more than a clock, and the accumulating inaccuracy of the correction signal itself. In an embodiment in which the timestamp interval is 600 milliseconds and the size of the correction signal is 24 bits, the correction signal is large enough such that the accumulated error in the correction signal over 600 ms is less than a clock.

In another embodiment of this invention, a digital filter could be used to average, or filter, successive timestamps obtained from the headend 200. Such filtering would greatly reduce any inherent jitter contained in the headend timestamps, such as would be due to MPEG synchronization. While such digital filtering would also mean that more timestamp values would need to be taken, considerable reduction of jitter might be achieved at the price of only a few seconds of real time. In most applications, clock acquisition times on the order of a second or two would generally be tolerable.

FIG. 11 illustrates, in simple block diagram form, one embodiment of an apparatus which can perform the synchronization method described above with respect to FIG. 10. This apparatus comprises the synchronization counter 552 which receives input from the D/S signal processor 553 and from the local clock 560, all of which are included in a cable modem 500 as described previously with respect to FIG. 5. The synchronization counter 552 comprises a correction signal generator 1105, an NCO correction circuit 1110, a D/S reference time generator 1115, and an U/S reference time generator 1120, each of which receive input from both the D/S signal processor 553 on line 1102 and the local clock 560 on line 1104. In one embodiment, the correction signal generator 1105, NCO correction circuit 1110, D/S reference time generator 1115, and the U/S reference time generator 1120 are implemented by digital logic circuit elements on an integrated circuit—these digital logic circuit elements include such common elements as AND, NAND, OR, NOR, XOR, XNOR, NOT, buffers, Adders, Half-Adders, Comparators, Flip-Flops, Counters, and Shift Registers among others. Fuller descriptions of how these logic elements work and how they are implemented in the design of digital logic circuits can be found in a number of electrical engineering textbooks. Among others, these references include the following which are hereby incorporated by reference herein: LEONARD S. BOBROW, *Fundamentals of Electrical Engineering*, Ch. 11–13 (1985); JERRY C. WHITAKER, *The Electronics Handbook*, Ch. 5–6, 45–46 (1996); PAUL HOROWITZ AND WINFELD HILL, *The Art of Electronics*, Ch. 8–9 (1980). In one embodiment, each of the correction signal generator 1105, NCO correction circuit 1110, D/S reference time generator 1115, and the U/S reference time generator 1120 are provided on the same integrated circuit. In these embodiments, the digital logic elements operate using the local clock 560 signal as their common clock timing signal.

The correction signal generator 1105 receives information from the D/S signal processor 553 on line 1102 and the local clock 560 signal on line 1104. The information on line 1102 may include timestamp information and other signals produced by the D/S signal processor 553 in response to the receipt of timing signals from the headend 200. These other signals may include, in one embodiment, pulsed logic level signals such as LoadTimeSync and syncFound, and digital data such as mmpMSGData all of which will be described in more detail with respect to FIGS. 12 and 13. The correction signal generator 1105 generates the correction signal described above with respect to FIG. 10 comprising the Offset and the AddSub signals, and provides the Offset and AddSub signals to the NCO correction circuit 1110.

The NCO correction circuit 1110 receives the Offset and Add Sub signals, information from the D/S signal processor 553 on line 1102 and the local clock 560 signal on line 1104. The NCO correction circuit 1110 operates using an accumulator as described with respect to FIG. 10 to add the Offset signal to an adder on every local clock pulse. When the accumulator rolls over, the NCO correction circuit generates a digital high Carryout signal and provides this signal to the D/S reference time generator 1115 along with the AddSub signal. The D/S reference time generator 1115 utilizes this information, along with information from the D/S signal processor 553 on line 1102, and the local clock 560 signal on line 1104 to generate the D/S reference time DSRef as will be described in further detail with respect to FIG. 13. Generally, in one embodiment of the invention, when the Carryout signal is low the DSRef signal comprises a signal that counts forward +1 with each pulse of the local clock 560. When the accumulator of the NCO correction circuit 1110 rolls over the Carryout signal goes high and the DSRef signal is corrected in accordance with the value of the AddSub signal. If the AddSub signal is high, the DSRef signal is adjusted upwards +2 on the current local clock 560 signal—if the AddSub signal is low, the DSRef signal is not adjusted at all on the current local clock 560 signal, it skips a forward count in order to adjust back to the headend 200 clock. In this manner, as discussed previously, one embodiment of the invention is designed such that the DSRef signal is equal to a clock signal that should never be off by more than a clock, and the accumulating inaccuracy of the correction signal itself.

The DSRef signal is then provided to the U/S reference time generator 1120. The U/S reference time generator 1120 uses this information to generate an USRef time that is provided to the CPU 542 and/or the U/S modulator 570 on line 1106 such that the modem 500 can accurately calculate its designated minislot times for transmitting upstream data on the cable modem system such that it does not collide with upstream data from other cable modems in the system. Thus, in one embodiment the USRef time is a time utilized by the modem 500 to determine when a particular minislot begins and ends. In one embodiment, the USRef is a 32 bit value in which the number of bits which represent a minislot is determined by the number of clocks in a minislot. In general, the USRef is a programmable delay offset from the DSRef The value of this delay offset is programmed into the modem 500 in one embodiment by a ranging procedure performed between the headend 200 and the modem 500 at modem 500 initial power up. The ranging procedure, in one embodiment consists of a procedure in which the headend 200 sends a calibrating signal out to determine how long it takes information to travel to a particular modem 500 as described previously above in the background section. This ranging procedure can also be performed by the headend 200 on particular modems in the system at various scheduled times during modem 500 operation so that the delay offset value may change during modem 500 operation. The delay offset determined by the ranging procedure is, in one embodiment, added to the DSRef signal to generate the USRef time. When the USRef time reaches a minislot time for the modem 500, the CPU 542 can direct a data transmission through the U/S modulator 570 to the headend 200. Since the DSRef signal is corrected to within one clock of the headend 200 clock, the data should reach the headend 200 within the designated minislot and should never be off by more than one clock plus any accumulated error in the correction signal, and any error in the value of the range time. The operation of the D/S reference generator 1120 is described below more specifically with respect to FIG. 13.

FIG. 12 illustrates logic circuitry which may be used to implement the correction signal generator 1105. The correction signal generator 1105 comprises oldTimeSync register 1205, difference logic element 1210, heTimeDiff register 1215, difference logic element 1220, TimeAlu divider logic element 1225, cmTimeDiff register 1230, local counter register 1240, +1 adder logic element 1235, difference logic element 1260, and local counter reset logic element 1250. Also shown is the D/S signal processor 553 which receives D/S data from the headend 200 via the D/S demodulator 530. When a timing type signal (timestamp) is detected from the headend 200, the D/S signal processor, in one embodiment, generates a digital high LoadTimeSync signal on line 1201, a digital high syncFound signal on line 1203, and signal mmpMSGData on line 1202 which consists of the actual headend timestamp value.

The oldTimeSync register receives its input from line 1202, and is activated by a Load signal from line 1201. The output of the oldTimeSync register 1205 is provided as an input to the difference logic element 1210. The difference logic element 1210 also receives an input from line 1202, and the output of the difference element 1210 is provided to the heTimeDiff register 1215. The heTimeDiff register 1215 is activated by a Load signal from line 1201, and the output of the heTimeDiff register 1215—which as described earlier with respect to FIG. 10 represents the time difference between successive timestamps—is provided to difference logic element 1220. The output of cmTimeDiff register 1230—which receives its input from local counter register 1240 and is activated by a Load signal on line 1203—is also provided to the difference logic element 1220. As stated with respect to FIG. 10, in one embodiment of the invention, the output of cmTimeDiff register 1230 is equal to the time which the cable modem local clock has counted between timestamps.

The output of difference logic element 1220 comprises data representing the difference between the heTimeDiff output and the cmTimeDiff output and has two portions designated by the bit positions of the data. In one embodiment, one bit of the output of the difference logic element 1220 represents whether the cmTimeDiff is greater than or less than the heTimeDiff—this is shown as signal newAddSub. In one embodiment, when the local clock is running faster than the headend 200 clock and the cmTimeDiff is correspondingly greater than the heTimeDiff, the newAddSub bit is a digital low or 0, and when the local clock is running slower than the headend 200 clock and the cmTimeDiff is correspondingly less than the heTimeDiff, the newAddSub bit is a digital high or 1. The remainder of the output of the difference logic 1220 represents the absolute difference between the cmTimeDiff and the heTimeDiff signals, and in one embodiment is a 24 bit signal. This absolute difference portion of the output is provided as an input to TimeAlu divider logic element 1225. Also provided as an input to the TimeAlu divider logic 1225 is the output of cmTimeDiff register 1230. The TimeAlu divider logic 1225 acts to divide the absolute difference by the cmTimeDiff and generate an output newOffset on line 1224 wherein the newOffset signal represents the local clock difference per clock as described above with respect to FIG. 10. The overall output of the correction signal generator 1105 is a correction signal which comprises both the newAddSub signal on line 1222 and the newOffset signal on line 1224.

The remainder of the elements of the correction signal generator 1105 are designed to provide for a new count of the local clock between each set of received timestamps. The difference logic element 1260 receives one input from the output of the cmTimeDiff register 1230 and another input from the output of the +1 adder logic element 1235. The output of the difference logic element 1260 is provided to input R (Reset) of the local counter reset logic element 1250. The C (Count) input of the local counter reset logic element 1250 is provided by the output of the +1 adder logic element 1235, and the local counter reset logic element 1250 is activated by a Load signal on line 1203. The output of the local counter reset logic element 1250 is provided to the input of the local counter register 1240. Finally, the output of the local counter register 1240 is provided to the input of the cmTimeDiff register 1230 and also to the input of the +1 adder logic element 1235.

The logic elements of the embodiment of the correction signal generator 1105 illustrated in FIG. 12 operate as follows upon the receipt of a timestamp signal from the headend 200 by the D/S signal processor. First, the syncFound signal is pulsed high thereby activating the cmTimeDiff register 1230, and the current value of the cmTimeDiff register 1230 is provided to the difference logic 1220 and the TimeAlu divider logic 1225. The output of the cmTimeDiff register 1230 is also provided to difference logic 1260 along with the output of +1 adder logic 1235. The output of the difference logic 1260 serves to then reset the local counter register 1240 to prepare for the next timestamp. This is because the pulsed high syncFound signal activates the local counter reset logic element 1250 and the input at R is then provided to the local counter 1240. When the syncFound signal again goes low, the value of the local counter register 1240 is provided by input C of the local counter reset logic element 1250, which in turn is provided by the output of the +1 adder logic 1235. The +1 adder logic 1235 receives an input from local clock 560 and serves to count up the value of the local counter 1240 upon each leading edge of the local clock 560 by a value of 1 clock. In this manner, the output of cmTimeDiff register 1230 always equals the true local clock time difference for a particular corresponding set of timestamps.

When the data representing the value of the timestamp signal is detected by the D/S signal processor 553, the LoadTimeSync signal is pulsed high thereby activating both the oldTimeSync register 1205 and the heTimeDiff register 1215. Simultaneously, the mmpMSGData signal representing the timestamp data is transmitted on line 1202 and latched into oldTimeSync register 1205. The old timestamp data from the previous timestamp which was resident in the oldTimeSync register 1205 is provided to difference logic 1210 along with the mmpMSGData and the difference between the old and new timestamps (heTimeDiff) is generated and latched into heTimeDiff register 1215 whose output is provided to one of the inputs of difference logic 1220. With the new values for heTimeDiff and cmTimeDiff now provided to the difference logic 1220 and the TimeAlu divider 1225, a new correction signal for the latest timestamp is now generated as described above.

FIG. 13 illustrates one embodiment of logic circuitry which may be used to implement the NCO correction circuit 1110, the D/S reference time generator 1115, and the U/S reference time generator 1120 of the synchronization counter 552 of FIG. 11. Also shown is D/S signal processor 553 which provides signals LoadTimeSync, mmpMSGData, and syncFound on lines 1201, 1202, and 1203 respectively as described previously. Similarly, correction signal generator 1105 is also shown as a provider of outputs newOffset and newAddSub on lines 1224 and 1222 respectively.

One embodiment of the NCO correction circuit 1110 comprises offset register 1355, adder logic element 1360, accumulator logic element 1365, offset register reset logic element 1350, difference logic element 1375, threshold register 1370, comparator logic element 1380, and AND gate 1385. The offset register reset logic element 1350 receives inputs newAddSub and newOffset on lines 1222 and 1224 respectively from the correction signal generator 1105. When the input to the Load (which is provided by the output of AND gate 1385) of offset register reset logic element 1350 is pulsed high the current contents of the offset register reset logic element 1350 are latched into the offset register 1355. Thus, although a newAddSub and newOffset signal are generated for each timestamp that is transmitted by the headend 200 as discussed above with respect to FIG. 12, the current value of the offset register 1355 is not updated unless certain conditions are satisfied which would make the Load signal on the output of AND gate 1385 go high. These conditions will be discussed below.

The offset register 1355 stores information which comprises the current Offset and AddSub being used by the modem 500 to synchronize its local clock 560 with the clock of the headend 200 by correcting the DSRef time and the USRef time as discussed earlier. The offset register 1355 provides the Offset signal (which in one embodiment is a 24 bit signal) as an input to the adder logic element 1360 and to the difference logic element 1375, and provides the AddSub signal as an input to the DSRef logic 1325 of the D/S reference time generator 1115. The adder logic element 1360 receives a second input signal from the accumulator logic element 1365, and the adder 1360 provides its output as an input to the accumulator logic element 1365. When the accumulator 1365 rolls over as discussed with respect to FIGS. 8 and 9, a digital high Carryout signal is generated which is provided to the DSRef logic 1325. As described above, the Offset signal is generated such that it approximately equals the clock difference between the local clock 560 and the headend 200 clock per cable modem clock. With this in mind, note that on every leading edge of the local clock 560, the Offset signal is added to the current value of the accumulator 1365 in the adder 1360 and provided to the accumulator 1365. In this manner, the accumulator 1365 should roll over at a time at which the local clock 560 is no more than one clock ahead or behind the headend 200 clock from the time of the last roll over. Therefore, when the accumulator 1365 rolls over and generates a high Carryout signal to the DSRef logic 1325 to make a synchronization correction to the DSRef 1315 time, it does so at a time such that the DSRef time 1315 (and correspondingly the USRef 1340 time) is never more than a clock from the headend 200 time.

The newOffset signal on line 1224 is also provided as an input to the difference logic element 1375, and the output of the difference logic 1375 is provided as an input to comparator logic 1380 along with the value of threshold register 1370. The output of the comparator logic 1380 is provided as an input to the AND gate 1385. In one embodiment, the second input of the AND gate is provided by a signal from the CPU 542. In this manner, as discussed briefly above, the output of the AND gate 1385 can be controlled such that it is high (and therefore the newOffset signal is latched into the offset register 1355 to be used as the current Offset signal) only when certain predefined or variable conditions are met. For instance, in one embodiment, when the difference between the newOffset and the current Offset differ by more than some predetermined threshold which is programmed into the threshold register 1370, then the output of the comparator 1380 is low and the output of the AND gate is low thereby disabling any latching of the newOffset into the offset register 1355. The value of the threshold register 1370 could be any user or system designated value which serves to ensure consistent modem 500 performance. In another embodiment, when the threshold register 1370 is exceeded, the cable modem 500 could generate an interrupt signal which disables the modem 500 from transmitting upstream data until some designated event such as a system time calibration is performed satisfactorily.

Similarly, the second input of the AND gate 1385, here illustrated as being provided from the CPU 542, can be used to dynamically or statically control when the newOffset is to be latched into the offset register 1355. For instance, software operating within a computer to which the cable modem 500 is attached may control the process such that the newOffset is latched at predetermined time intervals such as every 10th timestamp, or any other interval. In another instance, this interval may be determined randomly within some range of timestamp intervals. In still another instance, the designation of the timestamp interval to be used may be chosen by the user interfacing with the software program. In a further instance, the CPU 542 may provide a high pulsed signal on the second input of the AND gate 1385 dynamically in accordance with the performance of the cable modem 500. As shown in FIG. 13, if the output of difference logic 1320—which as will be described later is equal to the difference in time (DSRefDiff) between a headend timestamp and the corrected DSRef time of the modem 500— exceeds some static or adjustable threshold thereby indicating the current Offset signal is not adequately correcting the DSRef time, then the CPU may pulse its output to the AND gate 1385 in order to latch the newOffset into the offset register 1355 in an attempt to refine the DSReftime 1315.

One embodiment of the D/S reference time generator 1115 comprises oldTimeSync register 1305, SyncDSRef register 1310, DSRef register 1315, difference logic element 1320, and DSRef logic element 1325. The DSRef register 1315 provides the current DSRef time of the modem 500 which as described previously, is the modem's corrected or synchronized time signal. The DSRef register 1315 receives its input from the output of the DSRef logic 1325, and is updated on each clock signal of the local clock 560 in accordance with the operation of the DSRef logic 1325. The DSRef logic 1325 receives inputs from the difference logic 1320, the DSRef register 1315, and the AddSub and Carryout signals discussed above with respect to the NCO correction circuit 1110. The difference logic 1320 receives inputs from the oldTimeSync register 1305 and the SyncDSRef register 1310. The oldTimeSync register 1305 is activated by a high LoadTimeSync signal on line 1201 which is generated as described previously with respect to FIG. 12—and receives timestamp data as its input on line 1202 in the form of signal mmpMSGData from the D/S signal processor 553. The SyncDSRef register 1310 is activated by a high syncFound signal on line 1203 as described above with respect to FIG. 12—and receives the current DSRef time as its input from DSRef register 1315.

The embodiment of the D/S reference time generator 1115 illustrated in FIG. 13 operates as follows to generate the modem's 500 synchronized downstream time signal DSRef Generally, in one embodiment, the D/S reference time generator 1115 operates to generate a DSRef time that is an incrementing 10.248 MHz counter that is adjusted by new timestamps when they are received and adjusted continuously by the correction signal (Offset and AddSub) that is generated by the correction signal generator 1105 and applied by the NCO correction circuit 1110. More specifically, in the embodiment illustrated in FIG. 13, the DSRef logic 1325, on each clock cycle of the local clock, steps through the logic enumerated within block 1325 of FIG. 13. First, if the signal ldDSRef is a digital high, then the DSRef logic 1325 updates the value of DSRef in the DSRef register 1315 by setting it equal to the value of the previous DSRef time plus the DSRefDiff (which is equal to the output of difference logic 1320) plus 1 clock cycle. In one embodiment, the ldDSRef signal is high when the modem 500 receives a timestamp from the headend 200, and the difference between the timestamp data latched into the oldTimeSync register 1305 upon receipt of a timing signal is within some designated threshold of the value of the DSRef time latched into the SyncD SRef register 1310 when the timestamp is received. In one embodiment, if the DSRefDiff output of difference logic 1320 is greater than this threshold—which for instance might be set at 16 clocks in one embodiment—then the DSRef time should be construed as invalid and the upstream channel of the modem 500 is shut down to be resynchronized. Since the difference logic 1320 is comparing the value of a timestamp with the value of the modem's corrected time DSRef, then the difference DSRefDiff should be relatively small. If it is not small it would be an indication of a synchronization problem.

However, if the signal ldDSRef is low, then the DSRef logic 1325 proceeds to the next step of its enumerated logic steps. In the second step, the DSRef logic determines if both the Carryout and the AddSub signals are high. If they are not both high, the DSRef logic 1325 proceeds to the next step. If they are both high the DSRef logic 1325 updates the value of the DSRef register 1315 by setting it equal to the value of the previous DSRef plus two clocks. As noted earlier, when the Carryout is high it is an indication that the accumulator 1365 has rolled over and therefore that the local clock has deviated from the value of the headend clock by a single clock since the last roll over. Therefore, by adjusting the DSRef register 1315 up or down whenever Carryout is high, the DSRef time should never be more than a single clock off from the headend 200 time. In this case, the clock is adjusted ahead two clocks because the high AddSub signal is an indication that the local clock is slower than the headend 200 clock. In step three of the DSRef logic 1325, if Carryout is high (and AddSub is low) then the DSRef register is not advanced any clocks for that particular clock cycle. This serves to bring the DSRef time back to the headend 200 time since the low AddSub signal indicates that the local clock is faster than the headend 200. In the last step of the DSRef logic 1325, if none of the previous conditions are true, the DSRef logic 1325 updates the DSRef register 1315 by a single clock.

Lastly, the embodiment of the U/S reference time generator 1120 illustrated in FIG. 13 comprises an adder 1330, a range register 1335, and an USRef register 1340. The adder 1330 receives inputs from the DSRef register 1315 and the range register 1335, and provides output to the input of the USRef register 1340. As discussed earlier with respect to FIG. 11, the USRef register 1340 provides a synchronized time signal USRef with a delay offset to the CPU 542 and/or the U/S modulator 570. This USRef time is utilized to determine when the modem 500 can transmit upstream data such that it arrives at the headend 200 within that particular modem's designated mini timeslot such that it does not collide with upstream transmissions from other modem's in the system. The delay offset is determined by the value of the range register 1335 which, in one embodiment, holds a value representing the time which it takes a signal transmitted from that particular modem to reach the headend 200. In one embodiment, the range value is set by a ranging procedure performed between the headend 200 and the modem 500 at the power on of the modem. In other embodiments, this ranging procedure could be performed at set or random times throughout the operation of the modem in addition to the original power on ranging.

Although illustrative embodiments of the invention have been described in detail herein with reference to the accompanying drawings, it is to be understood that the invention is not limited to those precise embodiments. They are not intended to be exhaustive or to limit the invention to the precise forms disclosed. As such, many modifications and variations will be apparent to practitioners skilled in this art. Accordingly, it is intended that the scope of the invention be defined by the following claims and their equivalents.

What is claimed is:

1. In a communications system comprising a control unit that includes a master clock and a plurality of transceiver devices coupled to the control unit wherein each transceiver device includes a local clock, a method for synchronizing the local clock of at least one of the transceiver devices with the master clock, the method comprising the steps of:

receiving a first and second timestamp with the transceiver, wherein the first and second timestamp comprise signals generated by the control unit in response to the value of the master clock at the time the first and second timestamp signals are generated, respectively;

generating a first and second transceiver time reference with the transceiver device in response to the receipt of the first and second timestamp signals, respectively;

generating a correction factor in response to the first and second timestamp and the first and second transceiver time reference;

providing the correction factor to an accumulator device; and generating a synchronized downstream reference signal by adjusting an output clock signal of the local clock in response to the accumulator device.

2. The method of synchronizing the local clock with the master clock of claim 1 further comprising generating a synchronized upstream reference signal wherein the synchronized upstream reference signal comprises a time signal utilized by the transceiver to determine when the transceiver can transmit a first output signal to the control unit such that the first output signal does not collide with a second output signal transmitted by a different transceiver in the plurality of transceivers.

3. The method of synchronizing the local clock with the master clock of claim 2 wherein generating the upstream reference signal comprises one of adding and subtracting a delay offset time from the downstream reference time, wherein the delay offset time comprises the amount of time required for a ranging time signal to be received by the transceiver after the ranging time signal is transmitted by the control unit.

4. The method of synchronizing the local clock with the master clock of claim 1 wherein the transceiver device comprises a cable modem and the control unit comprises a headend unit.

5. The method of synchronizing the local clock with the master clock of claim 1 wherein the steps of generating a correction factor and generating a synchronized downstream reference signal are performed by digital logic.

6. The method of synchronizing the local clock with the master clock of claim 1 wherein the generation of the correction factor is responsive to a clock error time, the method further comprising:

generating a control unit difference comprising the difference of the first and second timestamp;

generating a transceiver difference time comprising the difference of the first and second transceiver time reference; and generating the clock error time wherein the clock error time comprises the difference of the control unit difference time and the transceiver difference time.

7. The method of synchronizing the local clock with the master clock of claim 6 wherein the first transceiver time reference comprises a time signal generated by the transceiver device in response to the value of the local clock at the time the first timestamp is received, and wherein the second transceiver time reference comprises a time signal generated by the transceiver device in response to the value of the local clock at the time the second timestamp is received.

8. The method of synchronizing the local clock with the master clock of claim 7 wherein the correction factor comprises an offset signal corresponding to the clock error time divided by the transceiver difference time.

9. The method synchronizing the local clock with the master clock of claim 8 wherein generating the synchronized downstream reference signal comprises:

adding the offset signal into the accumulator device on each pulse of the local clock; and adjusting the output clock signal when the accumulator device rolls over.

10. The method of synchronizing the local clock with the master clock of claim 9 wherein the correction factor comprises an addsub signal that indicates if the local clock is running one of faster and slower than the master clock, and wherein the output clock signal is adjusted in response to the addsub signal.

11. The method of synchronizing the local clock with the master clock of claim 6 further comprising generating a synchronized upstream reference signal wherein the synchronized upstream reference signal comprises a time signal utilized by the transceiver to determine when the transceiver can transmit a first output signal to the control unit such that the first output signal does not collide with a second output signal transmitted by a different transceiver in the plurality of transceivers.

12. The method of synchronizing the local clock with the master clock of claim 11 wherein generating the upstream reference signal comprises one of adding and subtracting a delay offset time from the downstream reference time, wherein the delay offset time comprises the amount of time required for a ranging time signal to be received by the transceiver after the ranging time signal is transmitted by the control unit.

13. In a cable modem communications system comprising a headend unit that includes a master clock and plurality of cable modems coupled of the headend unit wherein each cable modem includes a local clock, a method for synchronizing the local clock of at least one of the cable modems, the method comprising the steps of:

receiving a first timestamp with the cable modem, wherein the first timestamp comprises a signal generated by the headend unit in response to the value of the master clock at the time the first timestamp signal is generated;

generating a first cable modem time reference with the cable modem in response to the receipt of the first timestamp;

receiving a second timestamp with the cable modem, wherein the second timestamp comprises a signal generated by the headend unit in response to the value of the master clock at the time the second timestamp signal is generated;

generating a second cable modem time reference with the cable modem in response to the receipt of the second timestamp;

generating a headend difference time comprising the difference of the first and second timestamps;

generating a cable modem difference time comprising the difference of the first and second cable modem time references;

generating a clock error time that comprises the difference of the headend difference time and the cable modem difference time;

generating a correction factor in response to the clock error time;

providing the correction factor to an accumulator device; and generating a synchronized downstream reference signal by adjusting an output clock signal of the local clock in response to the accumulator device.

14. The method of synchronizing the local clock with the master clock of claim 13 further comprising generating a synchronized upstream reference signal wherein the synchronized upstream reference signal comprises a time signal utilized by the cable modem to determine when the cable modem can transmit a first output signal to the headend unit such that the first output signal does not collide with a second output signal transmitted by a different cable modem in the plurality of cable modems.

15. The method of synchronizing the local clock with the master clock of claim 14 wherein generating the upstream reference signal comprises one of adding and subtracting a delay offset time from the downstream reference signal, wherein the delay offset time comprises the amount of time required for a ranging time signal to be received by the cable modem after the ranging time signal is transmitted by the headend unit.

16. The method of synchronizing the local clock with the master clock of claim 13 wherein the steps of generating a correction factor and generating a synchronized downstream reference signal are performed by digital logic.

17. The method of synchronizing the local clock with the master clock of claim 13 wherein the first cable modem time reference comprises a time signal generated by the cable modem in response to the value of the local clock at the time the first timestamp is received, and wherein the second cable modem time reference comprises a time signal generated by the cable modem in response to the value of the local clock at the time the second timestamp is received.

18. The method of synchronizing the local clock with the master clock of claim 17 wherein the correction factor comprises an offset signal corresponding to the clock error time divided by the transceiver difference time.

19. The method of synchronizing the local clock with the master clock of claim 18 wherein generating the synchronized downstream reference signal comprises:

adding the offset signal into the accumulator device on each pulse of the local clock; and adjusting the output clock signal when the accumulator device rolls over.

20. The method of synchronizing the local clock with the master clock of claim 19 wherein the correction factor comprises an addsub signal that indicates if the local clock is running one of faster and slower than the master clock, and wherein the output clock signal is adjusted in response to the addsub signal.

21. In a communications system comprising a headend unit including a master clock and a plurality of cable modems coupled to the headend unit, a cable modem apparatus comprising:

an input/output node coupled to the headend unit;

a receiver, coupled to the input/output node, that receives a first and second timestamp generated by the headend unit in response to the value of the master clock at the time the first and second timestamp signals are generated, respectively;

a local clock; and a synchronization counter, coupled to the receiver, that generates a first and second cable modem time reference in response to the receipt of the first and second timestamp, respectively, wherein the synchronization counter further includes:

a correction signal generator that generates a correction factor in response to the first and second timestamp and the first and second cable modem time reference; and a correction circuit, including an accumulator device responsive to the correction factor, wherein the correction circuit generates a synchronized downstream reference signal by adjusting an output clock signal of the local clock in response to the accumulator device.

22. The cable modem apparatus of claim 21 wherein the correction circuit further generates a synchronized upstream reference signal wherein the synchronized upstream reference signal comprises a time signal utilized by the cable modem to determine when the cable modem can transmit a first output signal to the headend unit such that the first output signal does not collide with a second output signal transmitted by a different cable modem in the plurality of cable modems.

23. The cable modem apparatus of claim 22 wherein the correction circuit generates the upstream reference signal by one of adding and subtracting a delay offset time from the downstream reference signal and wherein the delay offset time comprises the amount of time required for a ranging time signal to be received by the cable modem after the ranging time signal is transmitted by the headend.

24. The cable modem apparatus of claim 21 wherein the correction signal generator and the correction circuit comprise digital logic.

25. The cable modem apparatus of claim 21 wherein the correction signal generator generates the correction factor in response to the difference of a headend difference time and a cable modem difference time, wherein the headend difference time comprises the difference of the first and second timestamp, and the cable modem difference time comprises the difference of the first and second cable modem time reference.

26. The cable modem apparatus of claim 25 wherein the first cable modem time reference comprises a time signal generated by the cable modem in response to the value of the local clock at the time the first timestamp is received, and wherein the second cable modem time reference comprises a time signal generated by the cable modem in response to the value of the local clock at the time the second timestamp is received.

27. The cable modem apparatus of claim 26 wherein the correction factor comprises an offset signal corresponding to a clock error time divided by the cable modem difference time, wherein the clock error time comprises the difference of the headend difference time and the cable modem difference time.

28. The cable modem apparatus of claim 27 wherein the synchronized downstream reference signal comprises a signal generated by:
adding the offset signal to the accumulator device on each pulse of the local clock; and
adjusting the output clock signal when the accumulator device rolls over.

29. The cable modem apparatus of claim 28 wherein the correction factor comprises an addsub signal that indicates if the local clock is running one of faster and slower than the master clock, and wherein the output clock signal is adjusted in response to the addsub signal.

30. The cable modem apparatus of claim 25 wherein the correction circuit further generates a synchronized upstream reference signal wherein the synchronized upstream reference signal comprises a time signal utilized by the cable modem to determine when the cable modem can transmit a first output signal to the headend unit such that the first output signal does not collide with a second output signal transmitted by a different cable modem in the plurality of cable modems.

31. The cable modem apparatus of claim 30 wherein the correction circuit generates the upstream reference signal by one of adding and subtracting a delay offset time from the downstream reference signal and wherein the delay offset time comprises the amount of time required for a ranging time signal to be received by the cable modem after the ranging time signal is transmitted by the headend.

32. In a communications system comprising a headend unit including a master clock and a plurality of cable modems coupled to the headend unit, a cable modem apparatus comprising:
an input/output node coupled to the headend unit;
a receiver, coupled to the input/output node, that receives a first timestamp generated by the headend unit in response to the value of the master clock at the time the first timestamp signal is generated, and that receives a second timestamp generated by the headend unit in response to the value of the master clock at the time the second timestamp signal is generated;
a local clock; and
a synchronization counter, coupled to the receiver, that generates a first cable modem time reference in response to the receipt of the first timestamp, and that generates a second cable modem time reference in response to the receipt of the second timestamp, wherein the synchronization counter further includes:
a correction signal generator that generates a correction factor in response to the difference of a headend difference time and a cable modem difference time, wherein the headend difference time comprises the difference of the first and second timestamps, and the cable modem difference time comprises the difference of the first and second cable modem time references; and
a correction circuit, including an accumulator device responsive to the correction factor, wherein the correction circuit generates a synchronized downstream reference signal by adjusting an output signal of the local clock in response to the accumulator device.

33. The cable modem apparatus of claim 32 wherein the correction signal generator and the correction circuit comprise digital logic.

34. The cable modem apparatus of claim 32 wherein the first cable modem time reference comprises a time signal generated by the cable modem in response to the value of the local clock at the time the first timestamp is received, and wherein the second cable modem time reference comprises a time signal generated by the cable modem in response to the value of the local clock at the time the second timestamp is received.

35. The cable modem apparatus of claim 34 wherein the correction factor comprises an offset signal corresponding to a clock error time divided by the cable modem difference time, wherein the clock error time comprises the difference of the headend difference time and the cable modem difference time.

36. The cable modem apparatus of claim 35 wherein the synchronized downstream reference signal comprises a signal generated by:
adding the offset signal into the accumulator device on each pulse of the local clock; and
adjusting the output clock when the accumulator device rolls over.

37. The cable modem apparatus of claim 36 wherein the correction factor comprises an addsub signal that indicates if the local clock is running one of faster and slower than the master clock, and wherein the output clock signal is adjusted in response to the addsub signal.

38. The cable modem apparatus of claim 37 wherein the correction circuit further generates a synchronized upstream reference signal wherein the synchronized upstream reference signal comprises a time signal utilized by the cable modem to determine when the cable modem can transmit a first output signal to the headend unit such that the first output signal does not collide with a second output signal transmitted by a different cable modem in the plurality of cable modems.

39. The cable modem apparatus of claim 38 wherein the correction circuit generates the upstream reference signal by one of adding and subtracting a delay offset time from the downstream reference signal and wherein the delay offset time comprises the amount of time required for a ranging time signal to be received by the cable modem after the ranging time signal is transmitted by the headend.

40. In a communications system comprising a control unit that includes a master clock and a plurality of transceiver devices coupled to the control unit wherein each transceiver device includes a local clock, an apparatus for synchronizing the local clock of at least one of the transceiver devices, the apparatus comprising:
a means for receiving a first and second timestamp, wherein the first and second timestamp comprise signals generated by the control unit in response to the value of the master clock at the time the first and second timestamp are generated, respectively;
a means for generating a first and second transceiver time reference in response to the receipt of the first and second timestamp, respectively;
a means for generating a correction factor in response to the first and second timestamp and the first and second transceiver time reference;
a means for providing the correction factor to an accumulator device; and
a means for generating a synchronized downstream reference signal that comprises an output clock signal of the local clock adjusted in response to the accumulator device.

41. The apparatus for synchronizing the local clock with the master clock of claim 40 further comprising a means for generating a synchronized upstream reference signal wherein the synchronized upstream reference signal comprises a time signal utilized by the transceiver to determine when the transceiver can transmit a first output signal to the control unit such that the first output signal does not collide with a second output signal transmitted by a different transceiver in the plurality of transceivers.

42. The apparatus for synchronizing the local clock with the master clock of claim 41 wherein generating the upstream reference signal comprises one of adding and subtracting a delay offset time from the downstream reference time, wherein the delay offset time comprises the amount of time required for a ranging time signal to be received by the transceiver after the ranging time signal is transmitted by the control unit.

43. The apparatus for synchronizing the local clock with the master clock of claim 40 wherein the transceiver device comprises a cable modem and the control unit comprises a headend unit.

44. The apparatus for synchronizing the local clock with the master clock of claim 40 wherein the means for generating a correction factor and the means for generating a synchronized downstream reference signal comprise digital logic.

45. The apparatus for synchronizing the local clock with the master clock of claim 40 wherein the generation of the correction factor is responsive to a clock error time, the apparatus further comprising:

a means for generating a control unit difference time comprising the difference of the first and second timestamp;

a means for generating a transceiver difference time comprising the difference of the first and second transceiver time reference; and a means for generating the clock error time wherein the clock error time comprises the difference of the control unit difference time and the transceiver difference time.

46. The apparatus for synchronizing the local clock with the master clock of claim 45 wherein the first transceiver time reference comprises a time signal generated in response to the value of the local clock at the time the first timestamp is received, and wherein the second transceiver time reference comprises a time signal generated in response to the value of the local clock at the time the second timestamp is received.

47. The apparatus for synchronizing the local clock with the master clock of claim 46 wherein the correction factor comprises an offset signal corresponding to the clock error time divided by the transceiver difference time.

48. The apparatus for synchronizing the local clock with the master clock of claim 40 wherein the means for generating the synchronized downstream reference signal comprises:

a means for adding the offset signal into the accumulator device on each pulse of the local clock; and a means for adjusting the output clock signal when the accumulator device rolls over.

49. The apparatus for synchronizing the local clock with the master clock of claim 48 wherein the correction factor comprises an addsub signal that indicates if the local clock is running one of faster and slower than the master clock, and wherein the means for generating the synchronized downstream reference signal adjusts the output clock signal in response to the addsub signal.

50. The apparatus for synchronizing the local clock with the master clock of claim 45 further comprising a means for generating a synchronized upstream reference signal wherein the synchronized upstream reference signal comprises a time signal utilized by the transceiver to determine when the transceiver can transmit a first output signal to the control unit such that the first output signal does not collide with a second output signal transmitted by a different transceiver in the plurality of transceivers.

51. The apparatus for synchronizing the local clock with the master clock of claim 50 wherein generating the upstream reference signal comprises one of adding and subtracting a delay offset time from the downstream reference time, wherein the delay offset time comprises the amount of time required for a ranging time signal to be received by the transceiver after the ranging time signal is transmitted by the control unit.

52. In a communications system comprising (i) a control unit that includes a master clock and a headend unit and (ii) a plurality of transceiver devices coupled to the control unit wherein each transceiver device includes a local clock and a cable modem, a method for synchronizing the local clock of at least one of the transceiver devices with the master clock, the method comprising the steps of:

receiving a first and second timestamp with the transceiver, wherein the first and second timestamp comprise signals generated by the control unit in response to the value of the master clock at the time the first and second timestamp signals are generated, respectively;

generating a first transceiver time reference and a second transceiver time reference with the transceiver device in response to the receipt of the first and second timestamp signals, respectively;

generating a correction factor in response to the first and second timestamp and the first and second transceiver time reference;

providing the correction factor to an accumulator device; and generating a synchronized downstream reference signal by adjusting an output clock signal of the local clock in response to the accumulator device.

53. The method of synchronizing the local clock with the master clock of claim 52, wherein the correction factor comprises an offset signal corresponding to the clock error time divided by the transceiver difference time.

54. The method of synchronizing the local clock with the master clock of claim 53, wherein generating the synchronized downstream reference signal comprises:

adding the offset signal into the accumulator device on each pulse of the local clock; and adjusting the output clock signal when the accumulator device rolls over.

* * * * *